United States Patent
Tamasho et al.

(10) Patent No.: US 6,748,310 B2
(45) Date of Patent: Jun. 8, 2004

(54) ELECTRIC BRAKE SYSTEM

(75) Inventors: Tadashi Tamasho, Kanagawa (JP); Masahiro Kubota, Yokohama (JP); Yukito Iwata, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 30 days.

(21) Appl. No.: 10/300,781

(22) Filed: Nov. 21, 2002

(65) Prior Publication Data

US 2003/0125863 A1 Jul. 3, 2003

(30) Foreign Application Priority Data

Dec. 28, 2001 (JP) .................................. 2001-401096

(51) Int. Cl.[7] .............................................. B60T 8/00
(52) U.S. Cl. ......................... 701/70; 701/76; 701/81; 188/18 A; 188/72.1; 180/179; 303/20
(58) Field of Search .............................. 701/70, 76, 81; 188/18 A, 72.1; 180/178, 179; 303/20

(56) References Cited

U.S. PATENT DOCUMENTS

| | | | | |
|---|---|---|---|---|
| 4,602,702 A | * | 7/1986 | Ohta et al. ................ | 188/72.1 |
| 5,230,549 A | * | 7/1993 | Osada et al. .................. | 303/3 |
| 5,957,246 A | | 9/1999 | Suzuki | |
| 6,000,507 A | | 12/1999 | Böhm et al. | |
| 6,226,586 B1 | * | 5/2001 | Luckevich et al. ............ | 701/70 |
| 6,230,854 B1 | * | 5/2001 | Schwarz et al. ............ | 188/156 |
| 6,237,729 B1 | | 5/2001 | Blattert | |
| 6,279,694 B1 | | 8/2001 | Böhm et al. | |
| 2002/0027387 A1 | | 3/2002 | Kubota | |

FOREIGN PATENT DOCUMENTS

| | | | | |
|---|---|---|---|---|
| DE | 19652230 A1 | * | 6/1998 | ............. B60T/1/06 |
| DE | 197 30 094 A1 | | 1/1999 | |
| DE | 199 43 601 A1 | | 3/2001 | |
| EP | 1 186 495 A1 | | 3/2002 | |
| JP | 9-137841 | | 5/1997 | |
| JP | 2002-81475 | | 3/2002 | |

* cited by examiner

Primary Examiner—William A. Cuchlinski, Jr.
Assistant Examiner—Eric M Gibson
(74) Attorney, Agent, or Firm—Foley & Lardner LLP

(57) ABSTRACT

In an electric brake system with at least an electric wheel brake mechanism having a pair of brake friction pads to produce a braking force based on a brake manipulated variable, and a brake friction pad thrust sensor detecting a pressure of either one of the brake friction pad pair against a disk rotor, an electric brake control unit causing a temporary movement of the brake friction pad pair into contact with the disk rotor when a predetermined time period has expired from a time when a brake pedal has been recovered to an inoperative state. In the system, a position of the brake friction pad pair, at which the pressure becomes greater than a predetermined threshold value during the temporary movement of the brake friction pad pair into contact with the disk rotor, is detected or determined as a braking initiation position.

12 Claims, 9 Drawing Sheets

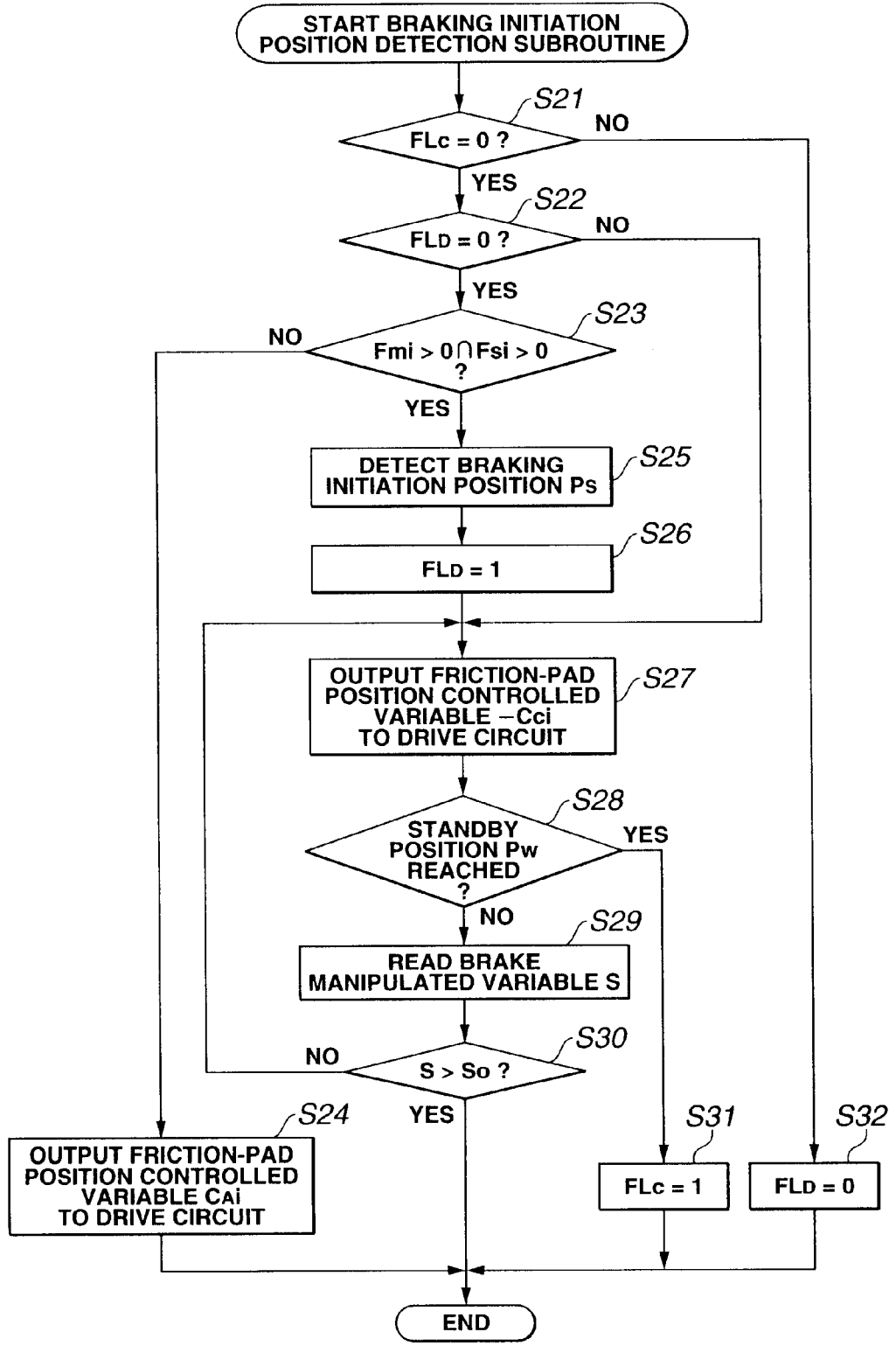

IN PRESENCE OF DEFLECTION OF DISK ROTOR TOWARD MOVABLE BRAKE FRICTION PAD

IN PRESENCE OF DEFLECTION OF DISK ROTOR TOWARD STATIONARY BRAKE FRICTION PAD

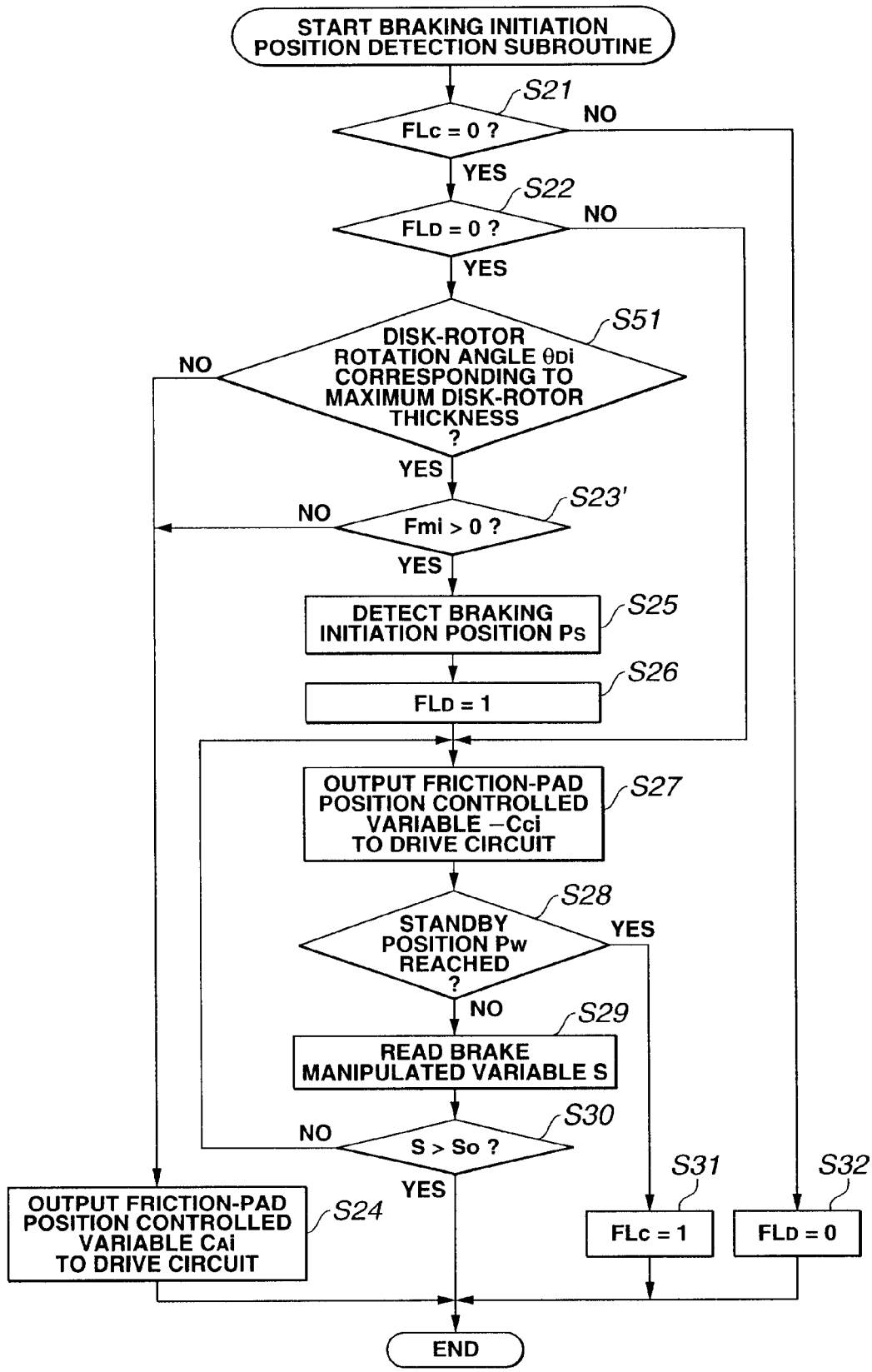

TWO-SIDED CONTACT OCCURRING AT DISK-ROTOR PORTION HAVING MAX. THICKNESS

ONE-SIDED CONTACT OCCURRING AT DISK-ROTOR PORTION HAVING THIN THICKNESS

ELECTRIC BRAKE SYSTEM

TECHNICAL FIELD

The present invention relates to an electric brake system, and particularly to an electronically controlled brake system based on electric brake mechanisms.

BACKGROUND ART

In recent years, there have been proposed and developed various electric brake systems, in which an electric brake actuator is controlled in response to a control signal from an electric-brake-system electronic control unit so as to vary the magnitude of braking force. The control signal value is based on the amount of depression of a brake pedal. One such electric brake system has been disclosed in Japanese Patent Provisional Publication No. 9-137841 (hereinafter is referred to as "JP9-137841"). The electric brake system disclosed in JP9-137841 is comprised of an electric brake actuator that advances and retracts a friction pad toward and away from a brake disk rotor, a thrust sensor that detects the magnitude of the pressure of the friction pad against the disk rotor, a position sensor that detects the position of the friction pad, and an electronic control unit that controls the operation of the electric brake actuator. The control unit has a thrust control function that controls the operation of the electric brake actuator responsively to a thrust indicative signal from the thrust sensor, and a position control function that controls the operation of the electric brake actuator responsively to a pad-position indicative signal from the position sensor. Concretely, a friction-pad position obtained at a timing that braking operation terminates and the magnitude of thrust or pressure of the friction pad against the disk rotor becomes zero is regarded as a braking initiation position. The friction pad is moved away from the braking initiation position by a predetermined distance or a predetermined clearance, each time braking operation terminates. Thus, it is possible to keep the pad-to-rotor clearance constant depending on the degree of friction-pad wear. However, in presence of undesired deflection or uneven wear of the disk rotor, and thermal expansion or thermal contraction, such a conventional electric brake system is still inadequate from the viewpoint of more-precise detection of the braking initiation position.

SUMMARY OF THE INVENTION

FIG. 10 shows an example of a friction-pad position versus thrust characteristic diagram. As can be seen from the characteristic diagram of FIG. 10, during the initial stage of braking operation, the friction pad is shifted toward the disk rotor from a state wherein the friction pad is held away from the disk rotor by a certain pad-to-rotor clearance, i.e., an initial pad-to-rotor clearance before a braking operation, and then brought into contact with the disk rotor (see an initial contact position Po in FIG. 10). For example, when downhill braking is continuously executed for a long time period from the initial stage of braking operation, the thrust of early stages of braking rises based on an initial-braking-period friction-pad rigidity characteristic (corresponding to a gradient of the right-hand side straight line shown in FIG. 10). However, when the downhill braking operation is released, owing to thermal expansion and reduced rigidity of the friction pad, arising from a great deal of frictional heat created during braking operation of the electric brake system, the thrust never falls in accordance with the initial-braking-period friction-pad rigidity characteristic. As can be appreciated from the characteristic diagram of FIG. 10, the thrust of last stages of the braking operation tends to fall based on a last-braking-period friction-pad rigidity characteristic (corresponding to a gradient of the left-hand side straight line shown in FIG. 10) different from the initial-braking-period friction-pad rigidity characteristic. That is, owing to thermal expansion and reduced rigidity of the friction pad, there is an increased tendency for the contact position of the friction pad with the disk rotor to become offset from initial contact position Po.

Suppose that the predetermined pad-to-rotor clearance is determined based on the contact position that is affected by thermal expansion and reduced rigidity of the friction pad and that is offset from initial contact position Po. In this case, if the friction pad is cooled during the non-braking state with the brake pedal undepressed and thus the friction pad is heat-contracted, the actual pad-to-rotor clearance varies from the previously-discussed initial pad-to-rotor clearance. Additionally, a heating state of the friction pad during braking operation always varies depending on the braking time, braking energy, non-braking time, vehicle speed during the non-braking period, and the like. The pad-to-rotor clearance tends to vary every braking operation. In particular, on four-wheeled vehicles, there is an increased tendency for the pad-to-rotor clearances at four road wheels to become different from each other. This means that there is a deviation of a timing of initiation of braking action (or braking force) at one of four road wheels from a timing of initiation of braking action (or braking force) at the other wheel, thereby resulting in a poorly balanced braking action between one of four road wheels and the other wheel and thus giving the driver a poor braking feel.

Accordingly, it is an object of the invention to provide an electric brake system, which avoids the aforementioned disadvantages.

It is another object of the invention to provide an electric brake system of an automotive vehicle with an electric-brake-system electronic control unit capable of electronically controlling the magnitude of pressure of a brake friction pad (a brake friction material) against a brake disk rotor (a rotary body being rotatable together with a road wheel), which is capable of maintaining a better braking balance among four road wheels of the vehicle by keeping the pad-to-rotor clearance at each of the road wheels constant, irrespective of the degree of friction-pad wear and the presence or absence of thermal expansion and reduced rigidity of the pad.

In order to accomplish the aforementioned and other objects of the present invention, an electric brake system comprises a brake manipulated variable sensor that detects a driver's brake manipulated variable of a brake operating device, an electric wheel brake mechanism having a pair of brake friction pads that are opposite to each other for sandwiching therebetween a disk rotor rotatable together with a road wheel and for producing a braking force resulting from braking torque application to the disk rotor, a first brake friction pad thrust sensor that detects a first pressure of a first one of the brake friction pad pair against one side wall of the disk rotor, a second brake friction pad thrust sensor that detects a second pressure of the second brake friction pad against the other side wall of the disk rotor, a control unit configured to be electronically connected to the brake manipulated variable sensor, the first and second brake friction pad thrust sensors and the electric wheel brake mechanism, for controlling the electric wheel brake mechanism responsively to the brake manipulated variable, and the first and second pressures, and the control unit causing a movement of the brake friction pad pair into contact with the disk rotor when the brake operating device is conditioned in an inoperative state, and detecting a position of the brake friction pad pair, at which the first and second pressures become greater than respective predetermined threshold values during the movement of the brake friction pad pair into contact with the disk rotor, as a braking initiation position.

According to another aspect of the invention, an electric brake system comprises a brake manipulated variable sensor that detects a driver's brake manipulated variable of a brake operating device, an electric wheel brake mechanism having a pair of brake friction pads that are opposite to each other for sandwiching therebetween a disk rotor rotatable together with a road wheel and for producing a braking force resulting from braking torque application to the disk rotor, a brake friction pad thrust sensor that detects a pressure of either one of the brake friction pad pair against the disk rotor, a control unit configured to be electronically connected to the brake manipulated variable sensor, the brake friction pad thrust sensor and the electric wheel brake mechanism, for controlling the electric wheel brake mechanism responsively to the brake manipulated variable, and the pressure of the one brake friction pad against the disk rotor, the control unit comprising a maximum disk-rotor thickness angular position detecting section that detects an angular position of the disk rotor at which a disk rotor portion has a maximum thickness, and the control unit causing a movement of the brake friction pad pair into contact with the disk rotor when the brake operating device is conditioned in an inoperative state, and detecting a position of the brake friction pad pair, at which the pressure becomes greater than a predetermined threshold value at the angular position of the disk rotor corresponding to the disk rotor portion having the maximum thickness during the movement of the brake friction pad pair into contact with the disk rotor, as a braking initiation position.

According to a further aspect of the invention, an electric brake system comprises a brake manipulated variable sensing means for detecting a driver's brake manipulated variable of a brake operating device, an electric wheel brake means having a pair of brake friction pads that are opposite to each other for sandwiching therebetween a disk rotor rotatable together with a road wheel and for producing a braking force resulting from braking torque application to the disk rotor, a first brake friction pad thrust sensing means for detecting a first pressure of a first one of the brake friction pad pair against one side wall of the disk rotor, a second brake friction pad thrust sensing means for detecting a second pressure of the second brake friction pad against the other side wall of the disk rotor, a brake control means configured to be electronically connected to the brake manipulated variable sensing means, the first and second brake friction pad thrust sensing means and the electric wheel brake means, for controlling the electric wheel brake means responsively to the brake manipulated variable, and the first and second pressures, and the control means causing a movement of the brake friction pad pair into contact with the disk rotor when the brake operating device is conditioned in an inoperative state, and detecting a position of the brake friction pad pair, at which the first and second pressures become greater than respective predetermined threshold values during the movement of the brake friction pad pair into contact with the disk rotor, as a braking initiation position.

According to a still further aspect of the invention, an electric brake system comprises a brake manipulated variable sensing means for detecting a driver's brake manipulated variable of a brake operating device, an electric wheel brake means having a pair of brake friction pads that are opposite to each other for sandwiching therebetween a disk rotor rotatable together with a road wheel and for producing a braking force resulting from braking torque application to the disk rotor, a brake friction pad thrust sensing means for detecting a pressure of either one of the brake friction pad pair against the disk rotor, a control means configured to be electronically connected to the brake manipulated variable sensing means, the brake friction pad thrust sensing means and the electric wheel brake means, for controlling the electric wheel brake means responsively to the brake manipulated variable, and the pressure of the one brake friction pad against the disk rotor, the control means comprising a maximum disk-rotor thickness angular position detecting section that detects an angular position of the disk rotor at which a disk rotor portion has a maximum thickness, and the control means causing movement of the brake friction pad pair into contact with the disk rotor when the brake operating device is conditioned in an inoperative state, and detecting a position of the brake friction pad pair, at which the pressure becomes greater than a predetermined threshold value at the angular position of the disk rotor corresponding to the disk rotor portion having the maximum thickness during the movement of the brake friction pad pair into contact with the disk rotor, as a braking initiation position.

According to another aspect of the invention, a method of detecting a braking initiation position of an electric brake system with a brake manipulated variable sensor detecting a driver's brake manipulated variable, an electric wheel brake mechanism having a pair of brake friction pads that are opposite to each other for sandwiching therebetween a disk rotor rotatable together with a road wheel and for producing a braking force resulting from braking torque application to the disk rotor and based on the brake manipulated variable, a first brake friction pad thrust sensor detecting a first pressure of a first one of the brake friction pad pair against one side wall of the disk rotor, and a second brake friction pad thrust sensor detecting a second pressure of the second brake friction pad against the other side wall of the disk rotor, the method comprises causing a primary movement of the brake friction pad pair into contact with the disk rotor when a predetermined time period has expired from a time when a brake pedal has been recovered to an inoperative state, and detecting a position of the brake friction pad pair, at which the first and second pressures become greater than respective predetermined threshold values during the primary movement of the brake friction pad pair into contact with the disk rotor, as the braking initiation position.

According to another aspect of the invention, a method of detecting a braking initiation position of an electric brake system with a brake manipulated variable sensor detecting a driver's brake manipulated variable, an electric wheel brake mechanism having a pair of brake friction pads that are opposite to each other for sandwiching therebetween a disk rotor rotatable together with a road wheel and for producing a braking force resulting from braking torque application to the disk rotor and based on the brake manipulated variable, and a brake friction pad thrust sensor detecting a pressure of either one of the brake friction pad pair against the disk rotor, the method comprises detecting an angular position of the disk rotor at which a disk rotor portion has a maximum thickness, causing a primary movement of the brake friction pad pair into contact with the disk rotor when a predetermined time period has expired from a time when a brake pedal has been recovered to an inoperative state, and detecting a position of the brake friction pad pair, at which the pressure becomes greater than a predetermined threshold value at the angular position of the disk rotor corresponding to the disk rotor portion having the maximum thickness during the primary movement of the brake friction pad pair into contact with the disk rotor, as the braking initiation position.

The other objects and features of this invention will become understood from the following description with reference to the accompanying drawings.

BRIEF DESCRIPTION OF THE DRAWINGS

FIG. 5 is a flow chart illustrating a series of braking initiation position detection procedures (a braking initiation position detection subroutine) executed within the control unit of the electric brake system of the first embodiment.

FIG. 8 is a flow chart illustrating a series of braking initiation position detection procedures executed within the control unit of the electric brake system of the second embodiment.

DESCRIPTION OF THE PREFERRED EMBODIMENTS

Figure 1:
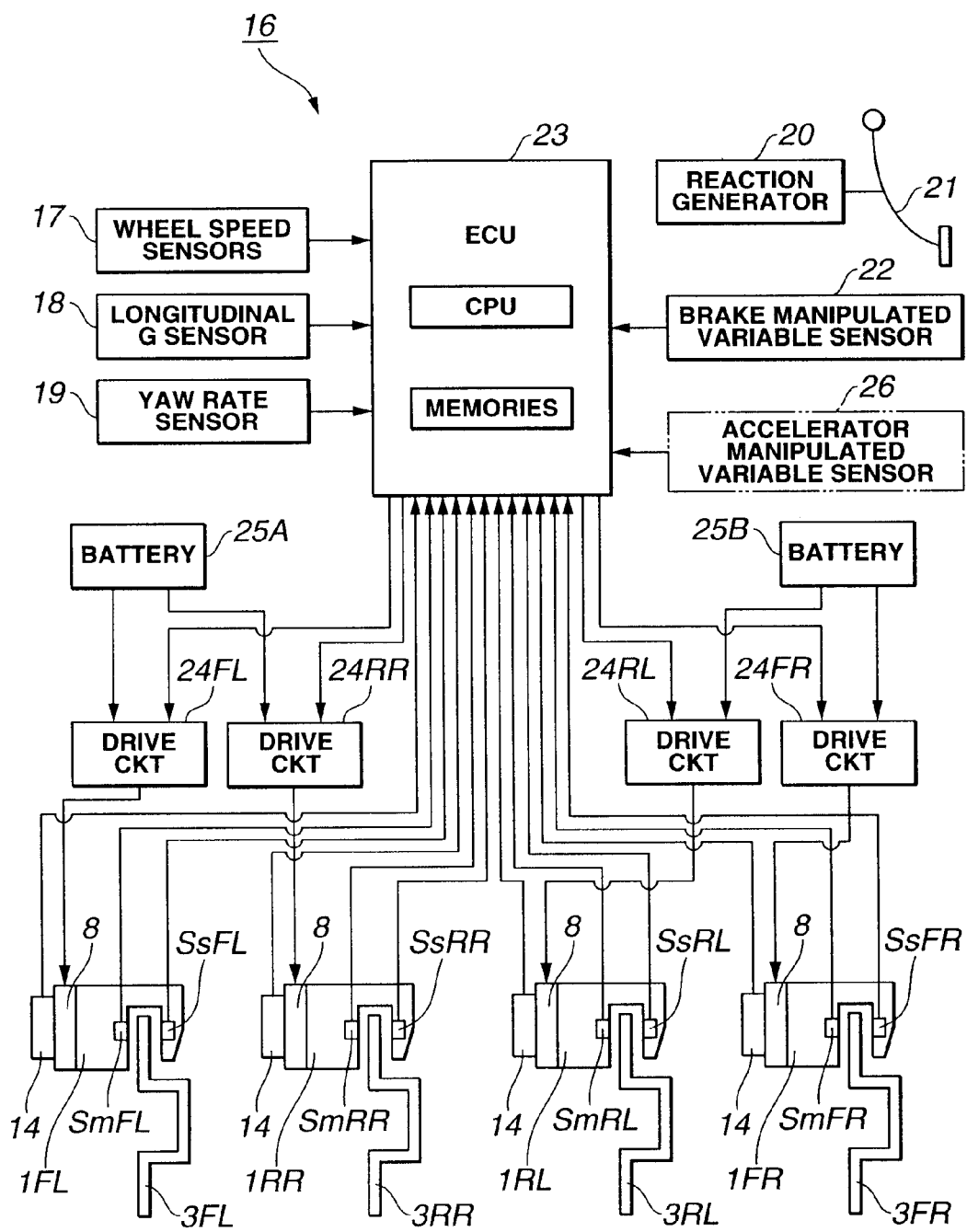
FIG. 1 is a system block diagram illustrating an electric brake system in accordance with one embodiment of the present invention.
Figure 2:
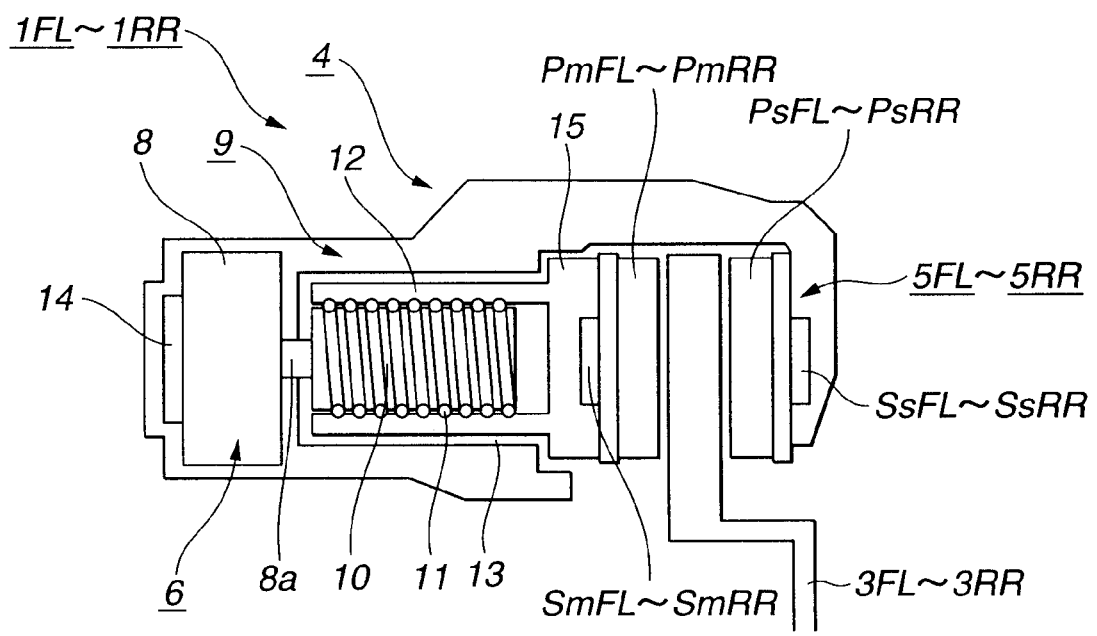
FIG. 2 is an enlarged cross-sectional view illustrating an electric brake mechanism incorporated in the electric brake system shown in FIG. 1.

Referring now to the drawings, particularly to FIG. 1, the electric brake system of the embodiment is exemplified in a four-wheeled vehicle having a front-left electric wheel brake mechanism 1FL, a front-right electric wheel brake mechanism 1FR, a rear-left electric wheel brake mechanism 1RL, and a rear-right electric wheel brake mechanism 1RR. Each of electric wheel brake mechanisms 1FR, 1FL, 1RL, and 1RR is provided to produce a braking force or a negative longitudinal force resulting from braking torque application to the associated road wheel. The detailed structures are the same in all electric wheel brake mechanisms 1FR, 1FL, 1RL, and 1RR. In case of necessity for discrimination among front-left, front-right, rear-left, and rear-right road wheels, the character "FL" is added to indicate component parts arranged in the front-left road wheel, the character "FR" is added to indicate component parts arranged in the front-right road wheel, the character "RL" is added to indicate component parts arranged in the rear-left road wheel, and the character "RR" is added to indicate component parts arranged in the rear-right road wheel. As best seen from the enlarged cross section of FIG. 2, each electric wheel brake mechanism 1 (1FL, 1FR, 1RL or 1RR) is comprised of a brake disk rotor 3 (3FL, 3FR, 3RL or 3RR) and a floating or swinging caliper 4. Brake disk rotor 3 serves as a rotary body that is rotatable together with the associated road wheel. Floating caliper 4 is equipped with a movable brake friction pad Pm (PmFL, PmFR, PmRL or PmRR), a stationary brake friction pad Ps (PsFL, PsFR, PsRL or PsRR), an electrically-operated drive mechanism (simply, an electric actuator) 6, a movable brake friction pad thrust sensor Sm (SmFL, SmFR, SmRL or SmRR), and a stationary brake friction pad thrust sensor Ss(SsFL, SsFR, SsRL or SsRR). Electric actuator 6 adjusts or controls the magnitude of the braking force (or the braking torque) applied to the associated disk rotor 3 by advancing and retracting movable brake friction pad Pm toward and away from disk rotor 3. A pair of brake friction pads, namely movable brake friction pad Pm and stationary brake friction pad Ps, which are opposite to each other so as to sandwich disk rotor 3 therebetween, construct a brake friction material 5 (5FL, 5FR, 5RL or 5RR). Movable brake friction pad Pm corresponds to a movable brake friction material portion, whereas stationary brake friction pad Ps corresponds to a fixed brake friction material portion. Caliper 4 is provided to apply braking force (exactly, braking torque) to associated disk rotor 3. In operation, a pressure (or thrust) produced by electric actuator 6 built in the caliper forces movable brake friction pad Pm to move toward disk rotor 3, and whereby movable brake friction pad Pm is brought into contact with one side wall of disk rotor 3. At the same time, the pressure (or thrust) of movable brake friction pad Pm against disk rotor 3 causes caliper 4 to swing inward slightly such that the fixed brake friction pad (stationary brake friction pad Ps) on the opposite side is brought into contact with the other side wall of disk rotor 3 to produce braking action. Movable brake friction pad thrust sensor Sm is provided to monitor or detect the pressure (thrust) Fmi of movable brake friction pad Pm against one side wall of disk rotor 3, whereas stationary brake friction pad thrust sensor Ss is provided to monitor or detect the pressure (thrust) Fsi of stationary brake friction pad Ps against the other side wall of disk rotor 3. Each of movable brake friction pad thrust sensor Sm and stationary brake friction pad thrust sensor Ss may be constructed by a piezo-resistance element. In lieu thereof, a strain gauge type load cell and a strain gauge may be used to detect the pressure (or thrust) of the friction pad against the disk rotor. Electric actuator 6 is comprised of an electric motor 8 (serving as a driving source) such as a direct current motor, and a rotary-to-linear motion converter 9. Rotary-to-linear motion converter 9 converts rotary motion of electric motor 8 into linear motion. Rotary-to-linear motion converter 9 includes a ball-screw-mechanism worm shaft (simply, a ball-screw shaft) 10, recirculating balls 11, a cylindrical-hollow ball nut 12, and an engaging portion 13. Ball-screw shaft 10 is fixedly connected to a rotating shaft 8a of electric motor 8. Ball nut 12 engages with ball-screw shaft 10 via recirculating balls 11. Recirculating balls 11 are interposed between the worm teeth of ball-screw shaft 10 and grooves cut in the inner periphery of ball nut 12, so that recirculating balls 11 roll between the worm and the ball nut. A rotary encoder 14 is installed on electric motor 8 to detect the rotation angle of motor shaft 8a and the direction of motor-shaft rotation. As can be seen from the cross section of FIG. 2, ball nut 12 is formed as a cylindrical member having a cylindrical bore closed at one axial end 15. The other end of cylindrical-hollow ball nut 12 is an opening end facing electric motor 8. The outer peripheral wall surface of ball nut 12 has a polygonal cross section, such as a triangular cross section or a square cross section. Also, the inner peripheral wall surface of floating caliper 4 has a polygonal cross section, such as a triangular cross section or a square cross section so that the shape of the inner periphery of floating caliper 4 conforms to the shape of the outer periphery of ball nut 12. Fitting the outer periphery of ball nut 12 into the inner periphery of floating caliper 4 prevents rotary motion of ball nut 12 relative to caliper 4. Alternatively, a key way and a key may be used to prevent rotary motion of ball nut 12 relative to caliper 4. That is, the outer periphery of ball nut 12 and the inner periphery of caliper 4 constructs engaging portion 13 that permits axial sliding motion of ball nut 12 and prevents rotary motion of ball nut 12. As clearly seen in FIG. 1, electric motor 8 of electric actuator 6 is electronically controlled by means of an electric-brake-system electronic control unit (ECU) 23 of an electric brake control system 16. ECU 23 (Electric-brake-system controller) generally comprises a microcomputer. ECU 23 includes an input/output interface (I/O), memories (RAM, ROM), and a microprocessor or a central processing unit (CPU). The input/output interface (I/O) of ECU 23 receives input information from various engine/vehicle sensors, namely wheel-speed sensors 17 (front-left, front-right, rear-left, and rear-right wheel-speed sensors 17FL, 17FR, 17RL, and 17RR), a longitudinal acceleration sensor 18, a yaw rate sensor 19, a brake manipulated variable sensor 22, rotary encoders 14 of four electric wheel brake mechanisms 1FL, 1FR, 1RL and 1RR, four movable brake friction pad thrust sensors SmFL, SmFR, SmRL and SmRR, and four stationary brake friction pad thrust sensor SsFL, SsFR, SsRL and SsRR. Longitudinal acceleration sensor 18 is provided to detect the longitudinal acceleration exerted on the vehicle body. Yaw rate sensor 19 is provided to detect a yaw rate of the vehicle, that is, a yaw velocity or a frequency of oscillation of the vehicle in the yaw sense. Brake manipulated variable sensor 22 is provided to monitor or detect the amount of depression of a brake pedal 21 (a brake operating device that is manually operated by the driver). In the shown embodiment, brake pedal 21 is equipped with a reaction generator 20 that generates a dummy reaction force correlated to the driver's braking action. Wheel speed sensor 17 is comprised of a serrated rotor that is rotatable together with the associated road wheel and a pulse generator. For example, the number Z of teeth of the serrated rotor is set to "32". A magnet is built in one of the teeth of the serrated rotor. The pulse generator includes a stationary built-in permanent magnet that is located to be opposite to the serrated rotor and a pickup coil (a magnetic-force sensing element serving as a Hall element) that detects an induced electromotive force caused by a magnetic flux generated. The pulse generator generates a wheel-speed indicative pulse signal based on the electromotive force corresponding to the rotational frequency of the serrated rotor attached to the associated road wheel. That is, wheel speed sensor 17 operates on the Hall-effect principle. Within ECU 23, the central processing unit (CPU) allows the access by the I/O interface of input informational data signals from the previously-discussed engine/vehicle sensors 17, 18, 19, 22, 14FL, 14FR, 14RL, 14RR, SmFL, SmFR, SmRL and SmRR, and SsFL, SsFR, SsRL and SsRR. The CPU of ECU 23 is responsible for carrying the electric-brake-control program (see FIG. 3 or 7) and braking initiation position detection program (see FIG. 5 or 8) stored in memories and is capable of performing necessary arithmetic and logic operations containing an electric brake system control management processing. Computational results or arithmetic calculation results (controlled variables for braking forces or braking torques to be produced by electric motors 8 of electric wheel brake mechanisms 1FL, 1FR, 1RL and 1RR and controlled variables for displacements of brake friction materials 5FL, 5FR, 5RL and 5RR to be moved toward or away from the respective disk rotors 3FL, 3FR, 3RL and 3RR), that is, calculated output signals are relayed via the output interface circuitry of ECU 23 to drive circuits 24FL, 24FR, 24RL, and 24RR. Controlled variables for braking forces or braking torques to be produced by electric motors 8 of electric wheel brake mechanisms 1FL, 1FR, 1RL and 1RR will be hereinafter referred to as "braking-force controlled variables". On the other hand, controlled variables for displacements of brake friction materials 5FL, 5FR, 5RL and 5RR to be moved toward or away from the respective disk rotors 3FL, 3FR, 3RL and 3RR will be hereinafter referred to as "friction-pad position controlled variables". Drive circuits 24FL, 24FR, 24RL, and 24RR output drive currents, which are based on the magnitudes and signs of the controlled variables for braking forces (or braking torques) and the magnitudes and signs of the controlled variables for displacements, to the respective electric motors 8 so as to properly drive each of the electric motors of electric wheel brake mechanisms 1FL, 1FR, 1RL and 1RR in a reverse-rotational direction or in a normal-rotational direction. In the shown embodiment, electric power is supplied from a first car battery 25A to drive circuits 24FL and 24RR associated with front-left and rear-right electric wheel brake mechanisms 1FL and 1RR, while electric power is supplied from a second car battery 25B different from the first car battery to drive circuits 24FR and 24RL associated with front-right and rear-left electric wheel brake mechanisms 1FR and 1RL. By virtue of such a dual car-battery arrangement (25A, 25B), even when the output power of a first one (for example, battery 25A) of car batteries 25A and 25B becomes excessively reduced due to a battery failure or a breakage of the wire harness, drive circuits 24FR and 24RL associated with the second battery (battery 25B) can be normally driven by means of the second battery. This insures the minimum braking force.

Figure 3:
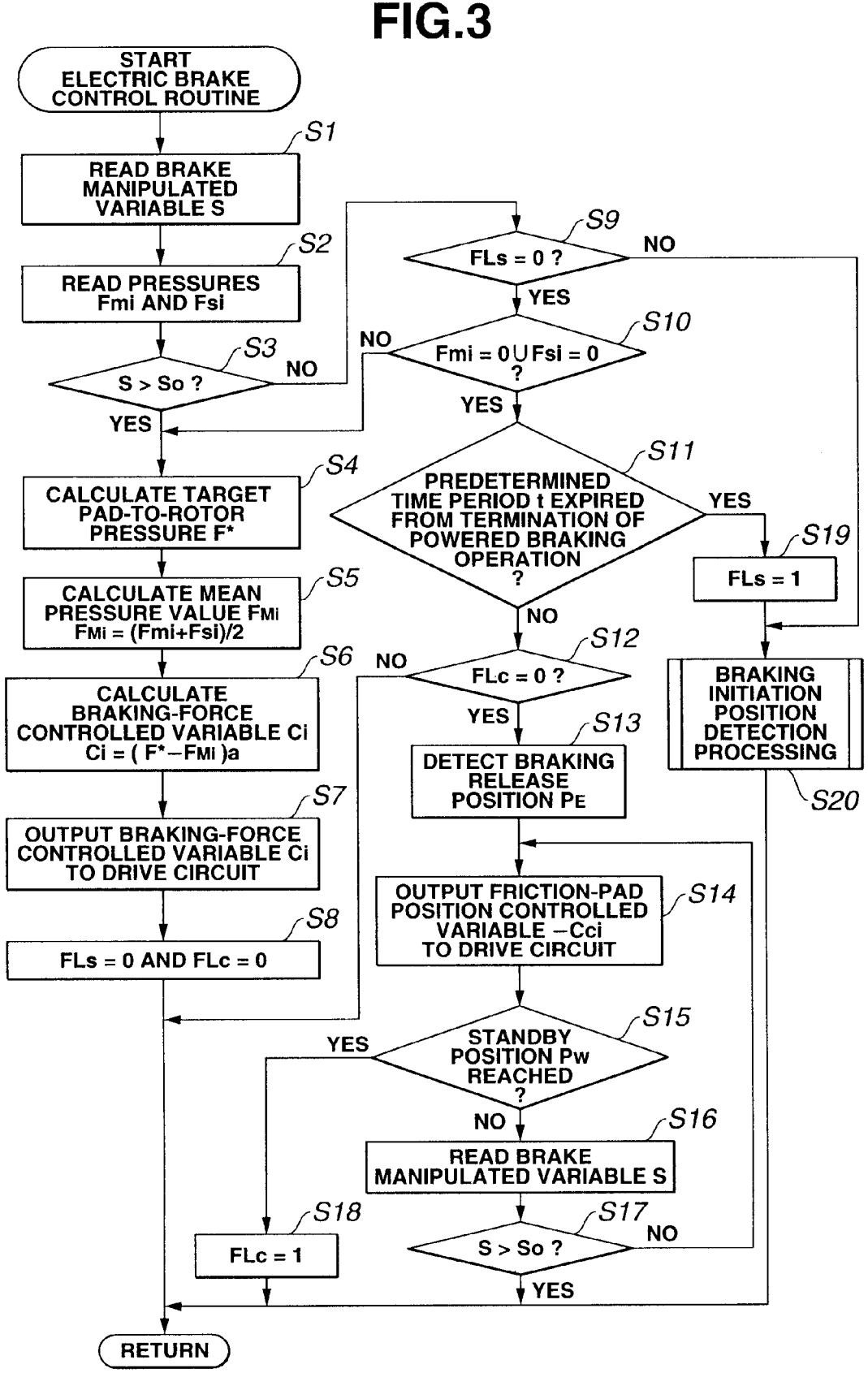
FIG. 3 is a flow chart illustrating a series of brake control procedures (an electric brake control routine) executed within an electric-brake-system electronic control unit incorporated in the electric brake system of the first embodiment.

Hereinafter described in detail in accordance with the flowchart shown in FIG. 3 is the electric brake control routine executed by the processor of ECU 23 of the electric brake system of the first embodiment. The electric brake control routine shown in FIG. 3 is executed as time-triggered interrupt routines to be triggered every predetermined sampling time intervals. Also, the electric brake control routine is performed for each electric wheel brake mechanism 1i (i=FR, FL, RL, RR).

At step S1, a signal value from brake manipulated variable sensor 22a, that is, a driver' brake manipulated variable S corresponding to the amount of depression of brake pedal 21 is read.

At step S2, a signal value from movable brake friction pad thrust sensor Smi (i=FR, FL, RL, RR), that is, the pressure Fmi of movable brake friction pad Pmi against one side wall of disk rotor $3i$, and a signal value from stationary brake friction pad thrust sensor Ssi (i=FR, FL, RL, RR), that is, the pressure Fsi of stationary brake friction pad Psi against the other side wall of disk rotor $3i$ are read.

At step S3, a check is made to determine whether brake manipulated variable S read at step S1 exceeds a predetermined brake-pedal play So. When the answer to step S3 is in the affirmative (YES), that is, in case of S>So, the processor of ECU 23 determines that the vehicle operating state has been shifted to a braking state owing to the driver's brake-pedal depression. Thus, when S>So, the routine proceeds from step S3 to step S4.

Figure 4:
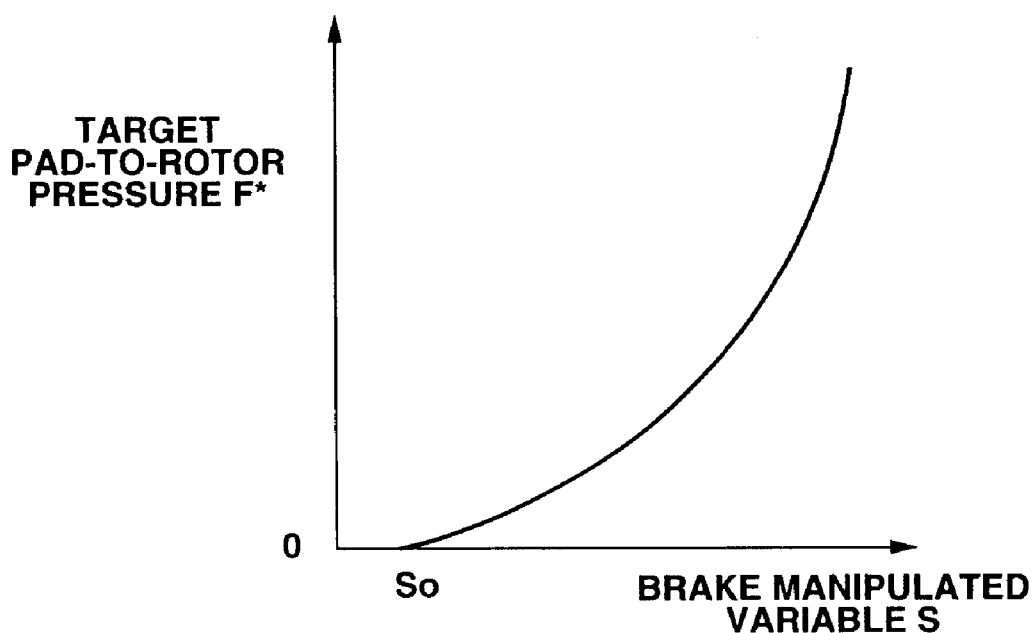
FIG. 4 is a brake manipulated variable S versus target pad-to-rotor pressure F* characteristic map stored in memories of the control unit of the electric brake system of the first embodiment.

At step S4, a target pad-to-rotor pressure F* is calculated or map-retrieved based on the brake manipulated variable S read through step S1 from a preprogrammed brake manipulated variable S versus target pad-to-rotor pressure F* characteristic map of FIG. 4 showing how target pad-to-rotor pressure F* must be varied relative to brake manipulated variable S. As can be appreciated from the S-F* characteristic map shown in FIG. 4, the S-F* characteristic is preset or preprogrammed so that target pad-to-rotor pressure F* is "0" when brake manipulated variable S is less than or equal to predetermined brake-pedal play So (i.e., S≦So), and that target pad-to-rotor pressure F* increases in a non-linear fashion as brake manipulated variable S increases from predetermined brake-pedal play So (see a moderate increase in target pad-to-rotor pressure F* at the early stage of brake manipulated variable S increasing from predetermined brake-pedal play So and a rapid increase in target pad-to-rotor pressure F* at the last stage of brake manipulated variable S increasing from predetermined brake-pedal play So).

At step S5, a mean pressure value FMi (=(Fmi+Fsi)/2) of movable-brake-friction-pad side pressure Fmi and stationary-brake-friction-pad side pressure Fsi is calculated based on the two pressure values Fmi and Fsi read at step S2.

At step S6, a braking-force controlled variable Ci for braking force or braking torque to be produced by electric motor 8 of each electric wheel brake mechanism $1i$ is calculated based on target pad-to-rotor pressure F* calculated through step S4 and mean pressure value FMi (=(Fmi+Fsi)/2) from a predetermined expression Ci=(F*−FMi)×a, where a is a coefficient.

At step S7, a calculated output signal, namely the braking-force controlled variable Ci, is output to drive circuit $24i$, so as to perform the drive control for the electric motor of each electric wheel brake mechanism $1i$.

At step S8, a switching flag FLs and a spaced flag FLc are both rest to "0". Switching flag FLs is used to determine switching from the electric brake control routine to the braking initiation position detection subroutine executed at step S20 (described later). FLs=1 means or indicates an enabled state for switching to the braking initiation position detection subroutine, whereas FLs=0 means or indicates a disabled state for switching to the braking initiation position detection subroutine. On the other hand, spaced flag FLc is used to determine a spaced state of movable brake friction pad Pmi (i=FL, FR, RL, RR) from disk rotor $3i$ after termination of the braking initiation position detection subroutine.

In contrast to the above, when the answer to step S3 is in the negative (NO), that is, in case of S≦So, the processor of ECU 23 determines that the driver has no intention of braking or the driver are still preparing for braking. In this case (S≦So), the routine proceeds from step S3 to step S9.

At step S9, a check is made to determine whether switching flag FLs (related to steps S8 and S19) is reset (=0). When the answer to step S9 is in the affirmative (YES), that is, in case of FLs=0, the processor of ECU 23 determines that switching to the braking initiation position detection subroutine is not yet made. Thereafter, step S10 occurs.

At step S10, a check is made to determine whether a predetermined condition defined by the union Fmi=0 ∪ Fsi=0 is satisfied. When the answer to step S10 is negative (NO), that is, when Fmi>0 ∩ Fsi>0, and thus the predetermined condition defined by the union Fmi=0 ∪ Fsi=0 is unsatisfied, the processor of ECU 23 determines that movable brake friction pad Pmi remains kept in contact with the one side wall of disk rotor $3i$ and additionally stationary brake friction pad Psi remains kept in contact with the other side wall of disk rotor $3i$. Therefore, the routine proceeds from step S10 to step S4, so that the actual pad-to-rotor pressure is brought closer to a pad-to-rotor pressure F corresponding to brake manipulated variable S that becomes less than or equal to predetermined brake-pedal play So. Conversely when the answer to step S10 is affirmative (YES) and thus the predetermined condition defined by the union Fmi=0 ∪ Fsi=0 is satisfied, the processor of ECU 23 determines that the brake operating device or the brake operating means (the brake pedal) is conditioned in an inoperative state, in other words, the electric brake system is conditioned in the non-braking state suited to brake manipulated variable S (≦So). Therefore, the routine proceeds from step S10 to step S11.

At step S11, a check is made to determine whether a predetermined time period t has expired from termination of the previous electrically powered braking operation (the previous powered braking cycle) executed by the electric brake system. The termination of the previous electrically powered braking operation (the previous powered braking cycle) executed by the electric brake system means that the brake operating device (brake pedal 21) has been recovered to its inoperative state. It is preferable to set predetermined time period t to a time period during which it is possible to radiate heat from brake friction material $5i$ to such an extent that the shape of brake friction material $5i$ recovers to its usual shape having less thermal expansion with the vehicle kept in the low-speed running state, even in the presence of thermal expansion of brake friction material $5i$ due to a great deal of frictional heat during braking. When the answer to step S11 is negative (NO), that is, the elapsed time from termination of the previous electrically powered braking operation is less than predetermined time period t, the processor of ECU 23 determines that brake friction material $5i$ is not yet adequately cooled. In this case, the routine proceeds from step S11 to step S12.

At step S12, a check is made to determine whether spaced flag FLc (related to steps S8 and S18) is reset (=0). When FLc=0, the processor of ECU 23 determines that a predetermined pad-to-rotor clearance Pc (described later) is not ensured. Thus, the routine proceeds from step S12 to step S13.

At step S13, the CPU of ECU 23 determines or sets a position of the movable brake friction material portion (movable brake friction pad Pmi) calculated when the predetermined condition defined by the union Fmi=0 ∪Fsi=0 becomes satisfied as a braking release position PE. The calculated position of the movable brake friction material portion (movable brake friction pad Pmi) is computed based on (i) the rotation angle of motor shaft 8a, (ii) the direction of motor-shaft rotation, and (iii) a screw pitch of ball-screw shaft 10 of rotary-to-linear motion converter 9, each time a transition from a state in which the predetermined condition defined by the union Fmi=0 ∪ Fsi=0 is unsatisfied to a state in which the predetermined condition defined by the union Fmi=0 ∪ Fsi=0 is satisfied, takes place. Thereafter, step S14 occurs.

At step S14, a friction-pad position controlled variable—Cci for a negative displacement of the movable brake friction material portion (movable brake friction pad Pmi) to be moved away from disk rotor 3i is output to drive circuit 24i, so as to execute the drive control for the electric motor of each electric wheel brake mechanism 1i. Herein, the minus sign of friction-pad position controlled variable—Cci indicates movement of movable brake friction pad Pmi away from disk rotor 3i or movement of movable brake friction pad Pmi out of contact with disk rotor 3i. Subsequently to step S14, step S15 occurs.

At step S15, a check is made to determine whether the movable brake friction material portion (movable brake friction pad Pmi) reaches a standby position Pw that movable brake friction pad Pmi has been spaced apart from braking release position PE by predetermined pad-to-rotor clearance Pc (simply, predetermined clearance Pc) as a result of the negative displacement of movable brake friction pad Pmi moving back away from braking release position PE. The determination of step S15 is based on whether the amount of negative displacement of movable brake friction pad Pmi moving back away from braking release position PE becomes identical to predetermined clearance Pc (a predetermined distance between braking release position PE and standby position Pw). The amount of negative displacement of movable brake friction pad Pmi moving back away from braking release position PE is determined based on (i) the rotation angle of motor shaft 8a, (ii) the direction of motor-shaft rotation, and (iii) the screw pitch of ball-screw shaft 10 of rotary-to-linear motion converter 9. When the answer to step S15 is negative (NO), that is, movable brake friction pad Pmi does not yet reach standby position Pw, the routine flows from step S15 via step S16 to step S17. In the same manner as step S1, at step S16 brake manipulated variable S corresponding to the amount of depression of brake pedal 21 is read again. Then, at step S17, a check is made to determine whether brake manipulated variable S read at step S16 exceeds predetermined brake-pedal play So. When S≦So, the processor of ECU 23 determines that the non-braking state (or the inoperative state) suited to brake manipulated variable S (≦So) is still maintained, and thus the routine flows from step S17 to step S14. Conversely when S>So, the processor of ECU 23 determines that a new electrically powered braking operation of the electric brake system initiates or starts and thus the routine returns from step S17 to step S1.

In contrast, when the answer to step S15 is affirmative (YES), that is, movable brake friction pad Pmi reaches standby position Pw, the routine flows from step S15 to step S18.

At step S18, spaced flag FLc is set to "1", and thereafter the routine returns from step S18 to step S1.

Returning to step S12, when the decision result of step S12 is negative (NO), that is, spaced flag FLc is set (=1), the routine returns from step S12 to step S1.

On the other hand, when the decision result of step S11 is affirmative (YES), the elapsed time from termination of the previous electrically powered braking operation reaches predetermined time period t, the processor of ECU 23 determines that brake friction material 5i has already been adequately cooled. Thereafter, the routine proceeds from step S11 to step S19.

At step S19, switching flag FLs from the electric brake control routine to the braking initiation position detection subroutine is set (=1). Then, step S20 occurs.

At step S20 the braking initiation position detection subroutine is initiated, as soon as switching flag FLs is set through step S19. Also, when the decision result of step S9 is negative (NO), that is, switching flag FLs has already been set, the routine jumps from step S9 directly to step S20. After step S20, the program returns to step S1.

Hereinafter described in detail in accordance with the flow chart shown in FIG. 5 is the braking initiation position detection subroutine executed by the processor of ECU 23 of the electric brake system of the first embodiment. The braking initiation position detection subroutine shown in FIG. 5 is executed as time-triggered interrupt routines to be triggered every predetermined sampling time intervals. Also, the braking initiation position detection subroutine is performed for each electric wheel brake mechanism 1i (i=FR, FL, RL, RR).

At step S21, a check is made to determine whether spaced flag FLc, which is set to "1" through steps S18 and S31 (described later), is reset to "0". When the answer to step S21 is affirmative (YES), that is, when FLc=0, the processor of ECU 23 determines that predetermined clearance Pc is not ensured. Thereafter, the subroutine proceeds from step S21 to step S22.

At step S22, a check is made to determine whether a braking initiation position detection flag FLD, which is set to "1" through step S26 (described later) and rest to "0" through step S32 (described later), is reset to "0". When the answer to step S22 is affirmative (YES), that is, when FLD=0, the processor of ECU 23 determines that the system is conditioned in an undetected state for a braking initiation position Ps. Thus, the subroutine proceeds from step S22 to step S23.

At step S23, a check is made to determine whether a predetermined condition defined by the intersection Fmi>0 ∩ Fsi>0 is satisfied. When the answer to step S23 is negative (NO), that is, when Fmi=0 ∪ Fsi=0, and thus the predetermined condition defined by the intersection Fmi>0 ∩ Fsi>0 is unsatisfied, the processor of ECU 23 determines that brake friction material 5i (in particular, movable brake friction pad Pmi) is held away from the braking initiation position Ps and brake friction material 5i is out of contact with disk rotor 3i. Therefore, the routine proceeds from step S23 to step S24.

At step S24, a friction-pad position controlled variable CAi for a positive displacement of the movable brake friction material portion (movable brake friction pad Pmi) to be temporarily moved toward disk rotor 3i is output to drive circuit 24i, so as to execute the drive control for the electric motor of each electric wheel brake mechanism 1i and temporarily bring movable brake friction pad Pmi into contact with disk rotor 3i for braking initial position detection purpose. Herein, the plus sign of friction-pad position controlled variable CAi indicates movement of movable brake friction pad Pmi toward disk rotor 3i or movement of movable brake friction pad Pmi into contact with disk rotor 3i. The subroutine returns from step S24 to step S1 of FIG. 3.

Conversely when the answer to step S23 is affirmative (YES) and thus the predetermined condition defined by the intersection Fmi>0 ∩ Fsi>0 is satisfied, the processor of ECU 23 determines that brake friction material 5i (in particular, movable brake friction pad Pmi) is held in the braking initiation position and thus brake friction material 5i is in contact with disk rotor 3i. Therefore, the routine proceeds from step S23 to step S25.

At step S25, the CPU of ECU 23 determines or sets a position of the movable brake friction material portion (movable brake friction pad Pmi) calculated when the predetermined condition defined by the intersection Fmi>0 ∩ Fsi>0 becomes satisfied as a braking initiation position Ps. The calculated position of the movable brake friction material portion (movable brake friction pad Pmi) is computed based on (i) the rotation angle of motor shaft 8a, (ii) the direction of motor-shaft rotation, and (iii) the screw pitch of ball-screw shaft 10 of rotary-to-linear motion converter 9, each time a transition from the state defined by the union Fmi=0 ∪ Fsi=0 to the state defined by the intersection Fmi>0 ∩ Fsi>0 takes place. Thereafter, the routine flows via step S26 to step S27.

At step S26, braking initiation position detection flag FLD is set to "1".

At step S27, friction-pad position controlled variable—Cci for negative displacement of the movable brake friction material portion (movable brake friction pad Pmi) to be moved away from disk rotor 3i is output to drive circuit 24i, so as to execute the drive control for the electric motor of each electric wheel brake mechanism 1i. Subsequently to step S27, step S28 occurs.

In a similar manner to step S15, at step S28 a check is made to determine whether the movable brake friction material portion (movable brake friction pad Pmi) reaches a standby position Pw that movable brake friction pad Pmi has been spaced apart from braking initiation position Ps by predetermined clearance Pc as a result of the negative displacement of movable brake friction pad Pmi moving back away from braking initiation position Ps. The determination of step S28 is based on whether the amount of negative displacement of movable brake friction pad Pmi moving back away from braking initiation position Ps becomes identical to predetermined clearance Pc between braking initiation position Ps and standby position Pw. The amount of negative displacement of movable brake friction pad Pmi moving back away from braking initiation position Ps is determined based on (i) the rotation angle of motor shaft 8a, (ii) the direction of motor-shaft rotation, and (iii) the screw pitch of ball-screw shaft 10 of rotary-to-linear motion converter 9. When the answer to step S28 is negative (NO), that is, movable brake friction pad Pmi does not yet reach standby position Pw, the routine flows from step S28 via step S29 to step S30. At step S29, brake manipulated variable S corresponding to the amount of depression of brake pedal 21 is read again. Then, at step S30, a check is made to determine whether brake manipulated variable S read at step S29 exceeds predetermined brake-pedal play So. When S≦So, the processor of ECU 23 determines that the non-braking state (or the inoperative state) suited to brake manipulated variable S (≦So) is still maintained and thus the routine flows from step S30 to step S27. Conversely when S>So, the processor of ECU 23 determines that a new electrically powered braking operation of the electric brake system initiates or starts, and thus the routine returns from step S30 to step S1 of FIG. 3.

In contrast, when the answer to step S28 is affirmative (YES), that is, movable brake friction pad Pmi reaches standby position Pw, the routine flows from step S28 to step S31. At step S31, spaced flag FLc is set to "1", and thereafter the routine returns from step S31 to step S1 of FIG. 3.

Returning to step S21, when the decision result of step S21 is negative (NO), that is, spaced flag FLc is set (=1), the routine jumps from step S21 to step S32.

At step S32, braking initiation position detection flag FLD is reset to "0", and thereafter the routine returns from step S32 to step S1 of FIG. 3.

Returning to step S22, when the answer to step S22 is negative (NO), that is, when FLD=1, the processor of ECU 23 determines that the system is conditioned in a detected state for braking initiation position Ps. Thus, the subroutine jumps from step S22 to step S27.

In the electric brake control routine shown in FIG. 3, the procedure of step S1 and brake manipulated variable sensor 22 function as a brake manipulated variable detector that detects or monitors brake manipulated variable S corresponding to the amount of depression of brake pedal 21. The procedure of step S2, movable brake friction pad thrust sensor Smi (i=FL, FR, RL, RR) and stationary brake friction pad thrust sensor Ssi function to detect the pressure (thrust) Fmi of movable brake friction pad Pmi against one side wall of disk rotor 3i and the pressure (thrust) Fsi of stationary brake friction pad Psi against the other side wall of disk rotor 3i.

With the previously-discussed system arrangement of the first embodiment, when the vehicle operating state is shifted from the vehicle straight-ahead driving state with brakes released to the braking state with the driver's brake-pedal depression and as a result brake manipulated variable S exceeds predetermined brake-pedal play So, the processor of ECU 23 calculates target pad-to-rotor pressure F* based on the value of brake manipulated variable S from the preprogrammed S-F* characteristic map shown in FIG. 4 (see the flow from step S3 to step S4 in FIG. 3). Thereafter, braking-force controlled variable Ci is calculated based on target pad-to-rotor pressure F* and mean pressure value FMi (=(Fmi+Fsi)/2) of the two pressure values Fmi and Fsi from predetermined expression Ci=(F*−Fmi)×a, so that the value of the controlled quantity (i.e., mean pressure value FMi) is brought closer to the desired value (i.e., target pad-to-rotor pressure F*) (see the flow from step S5 to step S6). The calculated braking-force controlled variable Ci is output to drive circuit 24i, and then the drive control for the electric motor of each electric wheel brake mechanism 1i initiates responsively to the calculated braking-force controlled variable Ci (see step S7). In this case, for application of the brakes, the electric motor of each electric wheel brake mechanism 1i is driven in the normal-rotational direction, and thus ball-screw shaft 10 is also driven in the normal-rotational direction. By virtue of the rotary-to-linear motion converting action of rotary-to-linear motion converter 9, movable brake friction pad Pmi of brake friction material 5i advances or moves toward disk rotor 3i. As a result, disk rotor 3i becomes sandwiched and loaded between movable brake friction pad Pmi and stationary brake friction pad Psi under pressure (whose pressure value corresponds to mean pressure value FMi). In this manner, a desired braking force (or a desired braking torque) can be produced by means of each electric wheel brake mechanism 1i. Thereafter, suppose that brake pedal 21 is somewhat released by the driver so as to reduce the amount of depression of brake pedal 21. In this case, in order to produce target pad-to-rotor pressure F* reflecting the reduction in brake manipulated variable S for each road wheel, the electric motor of each electric wheel brake mechanism 1i is driven in the reverse-rotational direction, and thus ball-screw shaft 10 is also driven in the reverse-rotational direction. By virtue of the rotary-to-linear motion converting action of rotary-to-linear motion converter 9, movable brake friction pad Pmi of brake friction material 5$i$ slightly retracts from disk rotor 3$i$. In this manner, the braking force can be properly reduced. After this, when the brakes are continuously released and as a result brake manipulated variable S becomes less than or equal to predetermined brake-pedal play So, a movable brake friction pad position calculated when the pressure Fmi of movable brake friction pad Pmi against one side wall of disk rotor 3$i$ or the pressure Fsi of stationary brake friction pad Psi against the other side wall of disk rotor 3$i$ becomes zero, that is, when the transition from the state defined by the intersection Fmi>0 ∩ Fsi>0 to the state defined by the union Fmi=0 ∪ Fsi=0 occurs, is determined or set as a braking release position P$E$ (see the flow from step S3 through steps S9, S10, S11 and S12 to step S13 in FIG. 3). Thereafter, the state defined by the inequality S≦So continues except for re-depression of brake pedal 21, and thus the electric motor of each electric wheel brake mechanism 1$i$ is continuously driven in the reverse-rotational direction (see the minus sign of friction-pad position controlled variable—Cci indicated in step S14). The continuous reverse-rotation of the electric motor of each electric wheel brake mechanism 1$i$ is executed until brake friction material 5$i$ (in particular, movable brake friction pad Pmi) becomes spaced away from disk rotor 3$i$ by predetermined pad-to-rotor clearance Pc, in other words, until the movable brake friction material portion (movable brake friction pad Pmi) reaches standby position Pw (see steps S14 and S15). As set forth above, after termination of the electrically powered braking operation, movable brake friction pad Pmi retracts from disk rotor 3$i$ by predetermined pad-to-rotor clearance Pc. Therefore, irrespective of friction-pad wear gradually developing owing to repetition of braking operations, the electric brake system of the first embodiment enables the clearance between brake friction material 5$i$ and disk rotor 3$i$ to be maintained at a constant value (predetermined pad-to-rotor clearance Pc). By virtue of such friction-pad wear compensation, it is possible to prevent the undesirable deviation of the timing of initiation of braking action (or braking force) at one of four road wheels from the timing of initiation of braking action (or braking force) at the other wheel, thus ensuring a better balanced braking action between one of four road wheels and the other wheel, and consequently giving the driver a good braking feel.

According to the system of the first embodiment, even when thermal expansion of brake friction material 5$i$ arises from a great deal of frictional heat created due to continuous execution of the electrically powered braking operation for a long time period during long downhill driving or intermittent repetition of the electrically powered braking operation during long downhill driving, it is possible to ensure the constant clearance, that is, predetermined pad-to-rotor clearance Pc. If brake pedal 21 is re-depressed by the driver soon (with a comparatively short time delay less than predetermined time period t) after termination of the electrically powered braking operation, brake friction material 5$i$ is not yet adequately cooled and therefore the actual clearance between brake friction material 5$i$ and disk rotor 3$i$ is maintained substantially at predetermined pad-to-rotor clearance Pc. Thus, it is possible to minimize or suppress the deviation of the timing of initiation of braking action (or braking force) at one of four road wheels from the timing of initiation of braking action (or braking force) at the other wheel.

In contrast to the above, if brake pedal 21 is not re-depressed by the driver soon (with a comparatively short time delay less than predetermined time period t) after termination of the electrically powered braking operation and thus the undepressed state of brake pedal 21 continues for a time period longer than or equal to predetermined time period t, brake friction material 5$i$ is adequately cooled and heat-contracted. Therefore, the actual clearance between brake friction material 5$i$ and disk rotor 3$i$ varies from predetermined pad-to-rotor clearance Pc. Due to heat-contraction of brake friction material 5$i$, the actual clearance tends to increase in comparison with predetermined pad-to-rotor clearance Pc. In the event that predetermined time period t has expired from termination of the electrically powered braking operation, for compensation for undesired offsetting of the actual clearance from predetermined pad-to-rotor clearance Pc, occurring due to heat-contraction of brake friction material 5$i$, the system of the first embodiment begins to execute the braking initiation position detection subroutine shown in FIG. 5 (see the flow from step S11 via steps S19 and S20 of FIG. 3 through steps S21, S22 and S23 to step S24 of FIG. 5). In order to bring the actual clearance closer to predetermined pad-to-rotor clearance Pc, friction-pad position controlled variable C$A$i for positive displacement of the movable brake friction material portion (movable brake friction pad Pmi) to be moved toward disk rotor 3$i$ is output to drive circuit 24$i$ (see step S24). This causes movement of brake friction material 5$i$ into contact with disk rotor 3$i$. Thereafter, as soon as brake friction material 5$i$ comes into contact with disk rotor 3$i$ and thus the transition from the state defined by the union Fmi=0 ∪ Fsi=0 to the state defined by the intersection Fmi>0 ∩ Fsi>0 occurs, a movable brake friction pad position calculated when the transition from the state defined by the union Fmi=0 ∪ Fsi=0 to the state defined by the intersection Fmi>0 ∩ Fsi>0 occurs, is determined or set as a braking initiation position Ps (see the flow from step S21 through steps S22 and S23 to step S25).

Figure 6A:
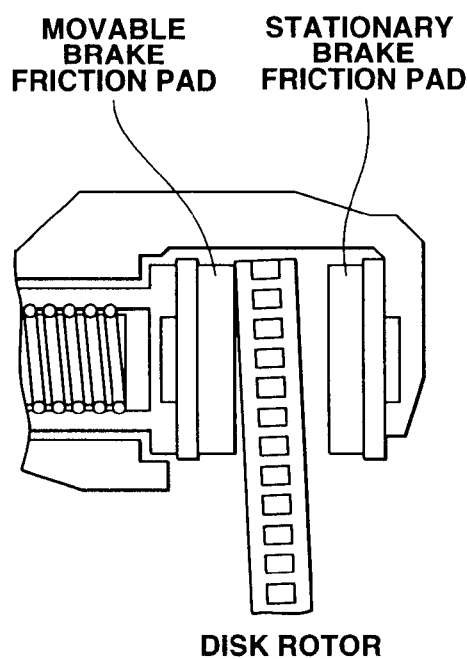
FIG. 6A is an explanatory view illustrating the occurrence of pressure of a brake friction material against a brake disk rotor in presence of a slight deflection of the disk rotor toward a movable brake friction pad.
Figure 6B:
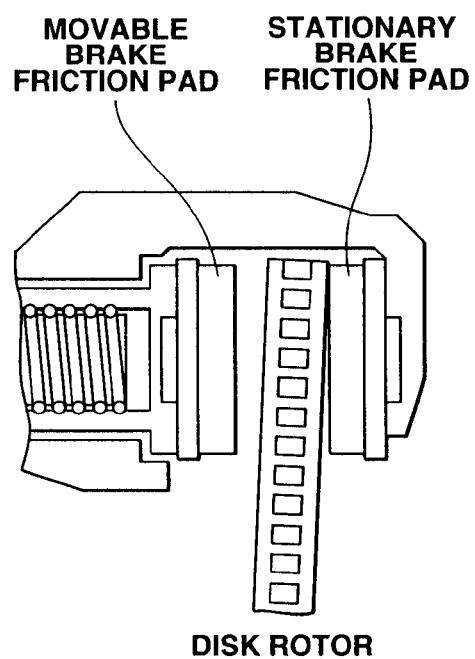
FIG. 6B is an explanatory view illustrating the occurrence of pressure of a brake friction material against a brake disk rotor in presence of a slight deflection of the disk rotor toward a stationary brake friction pad.

As shown in FIGS. 6A and 6B, actually, a slight deflection, such as several tens millimeters of deflection, of disk rotor 3$i$ toward brake friction material 5$i$ (movable brake friction pad Pmi or stationary brake friction pad Psi) often exists. In the presence of the slight deflection of disk rotor 3$i$ toward brake friction material 5$i$, there is a clearance difference between a first clearance defined between movable brake friction pad Pmi and one side wall of disk rotor 3$i$ and a second clearance defined between stationary brake friction pad Psi and the other side wall of disk rotor 3$i$. For instance, in the presence of the slight deflection of disk rotor 3$i$ toward movable brake friction pad Pmi (see FIG. 6A) or in the presence of the slight deflection of disk rotor 3$i$ toward fixed brake friction pad Psi (see FIG. 6B), during the early stage of the electrically powered braking operation of the electric brake system, there is an increased tendency for disk rotor 3$i$ to be brought into contact with either one of movable brake friction pad Pmi and fixed brake friction pad Psi. In such a case, the unbalanced pressure of brake friction material 5$i$ against disk rotor 3$i$ may be produced by a dragging effect imposed owing to frictional contact of disk rotor 3$i$ with either one of movable brake friction pad Pmi and fixed brake friction pad Psi. If a movable brake friction pad position calculated when the pressure (or thrust) of brake friction material 5$i$ against disk rotor 3$i$ is produced by only the one-sided contact of disk rotor 3$i$ with either one of movable brake friction pad Pmi and fixed brake friction pad Psi is erroneously determined or detected as a braking initiation position Ps, the detection accuracy for braking initiation position Ps may be lowered or deteriorated. In other words, if a movable brake friction pad position calculated when a predetermined condition defined by the union Fmi>0 ∪ Fsi>0 becomes satisfied, is erroneously determined or detected as a braking initiation position Ps, the detection accuracy for braking initiation position Ps may be lowered or deteriorated. To avoid this and to enhance the detection accuracy for braking initiation position Ps, in the system of the first embodiment uses the predetermined condition defined by the intersection Fmi>0 ∩ Fsi>0 as a criterion needed to more precisely determine braking initiation position Ps (see the flow from step S23 to step S25). After detection of braking initiation position Ps, performed through step S25, the state defined by the inequality S≦So continues except for re-depression of brake pedal 21, and thus the electric motor of each electric wheel brake mechanism 1$i$ is continuously driven in the reverse-rotational direction (see the minus sign of friction-pad position controlled variable—Cci indicated in step S27). The continuous reverse-rotation of the electric motor of each electric wheel brake mechanism 1$i$ is executed until brake friction material 5$i$ (in particular, movable brake friction pad Pmi) becomes spaced away from disk rotor 3$i$ by predetermined pad-to-rotor clearance Pc, in other words, until the movable brake friction material portion (movable brake friction pad Pmi) reaches standby position Pw (see steps S27 and S28). As set out above, according to the system of the first embodiment, it is possible to properly timely maintain the clearance between brake friction material 5$i$ and disk rotor 3$i$ substantially at a constant value (predetermined pad-to-rotor clearance Pc), irrespective of the presence or absence of thermal expansion and thermal contraction. This enables optimal compensation for the pad-to-rotor clearance, regardless of changes in the shape in brake friction material 5$i$. With the movable brake friction material portion (movable brake friction pad Pmi) kept at standby position Pw, taking account of thermal expansion and thermal contraction of brake friction material 5$i$, the system of the first embodiment insures a better balanced braking action between one of four road wheels and the other wheel and thus giving the driver a good braking feel.

As will be appreciated from the above, according to the system of the first embodiment, before predetermined time period t expires from termination of the electrically powered braking operation, standby position Pw is determined by using braking release position P$_E$ as a reference of predetermined pad-to-rotor clearance Pc. After predetermined time period t has expired from termination of the electrically powered braking operation, standby position Pw is determined by using braking initiation position Ps as a reference of predetermined clearance Pc. Note that braking release position P$_E$ (under a condition that brake friction material 5$i$ is not yet adequately cooled) is different from braking initiation position Ps (under a condition that brake friction material 5$i$ is adequately cooled). Briefly speaking, the system of the first embodiment operates to cause movement of brake friction material 5$i$ into contact with disk rotor 3$i$ (see the plus sign of friction-pad position controlled variable C$_{Ai}$ in step S24) under a particular condition where the brake operating device or the brake operating means (the brake pedal) is conditioned in an inoperative state, in other words, the electric brake system is conditioned in the non-braking state (see the flow from step S23 to step S24) after predetermined time period t has expired from termination of the electrically powered braking operation. In determining the contact position that brake friction material 5$i$ comes into contact with disk rotor 3$i$ as braking initiation position Ps, the previously-noted predetermined condition defined by the intersection Fmi>0 ∩ Fsi>0 is used as a criterion. There is no risk that braking initiation position Ps is erroneously determined or detected owing to the pressure (or thrust) of brake friction material 5$i$ against disk rotor 3$i$, produced by only the one-sided contact of disk rotor 3$i$ with either one of movable brake friction pad Pmi and fixed brake friction pad Psi. This ensures high-precision braking initiation position Ps detection.

Figure 7:
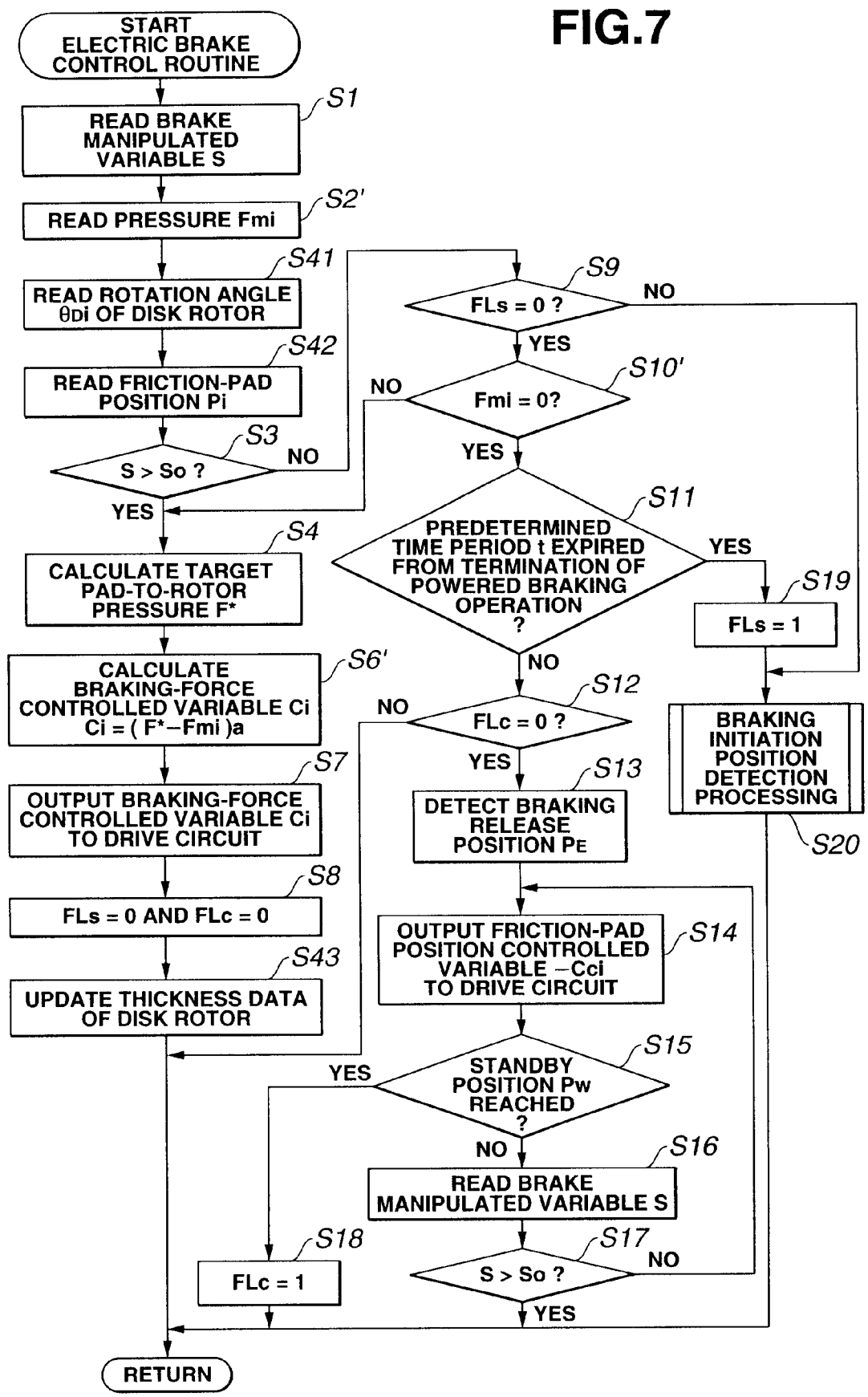
FIG. 7 is a flow chart illustrating a series of brake control procedures executed within the control unit of the electric brake system of the second embodiment.
Figure 9A:
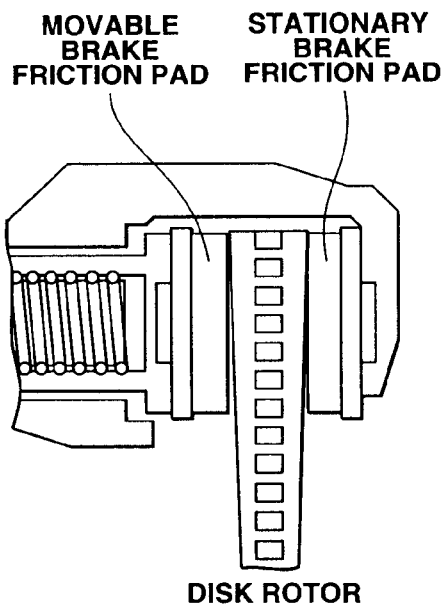
FIG. 9A is an explanatory view illustrating a state of both-sided contact occurring at a disk-rotor portion (having a relatively smaller deflection) whose thickness may become maximum owing to relatively smaller disk-rotor wear.
Figure 9B:
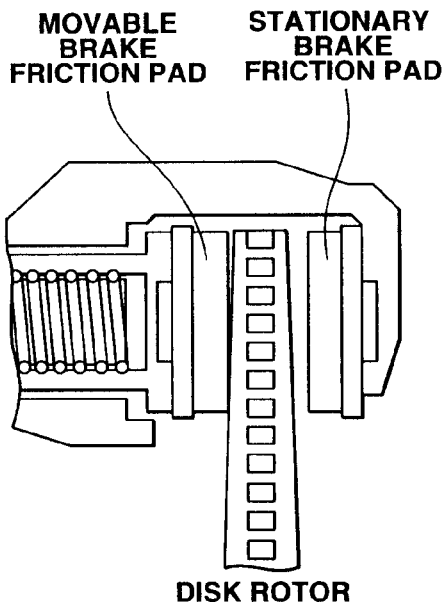
FIG. 9B is an explanatory view illustrating a state of single-sided contact occurring at a disk-rotor portion (having a relatively larger deflection) whose thickness may become thin owing to relatively greater disk-rotor wear.
Figure 10:
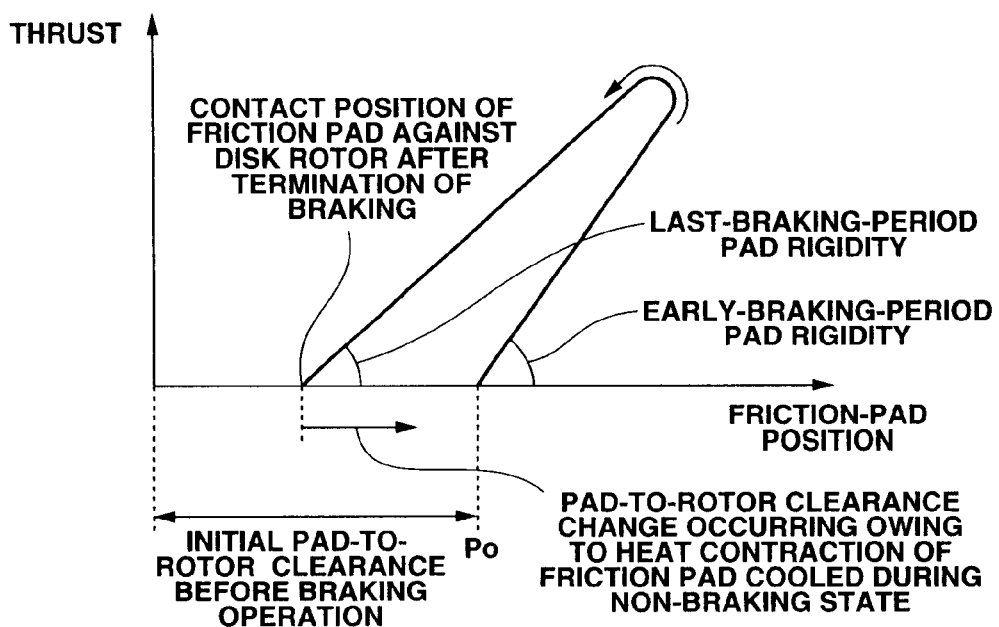
FIG. 10 is a general friction-pad position versus thrust characteristic diagram showing the difference between the initial-braking-period friction-pad rigidity characteristic and the last-braking-period friction-pad rigidity characteristic.

FIGS. 7, 8, 9A and 9B relate to the electric brake system of the second embodiment. Hereinafter described in detail in accordance with the flow chart shown in FIG. 7 is the electric brake control routine executed within of the electric brake system of the second embodiment as time-triggered interrupt routines to be triggered every predetermined sampling time intervals. The arithmetic processing of the second embodiment shown in FIG. 7 is somewhat modified from that of the first embodiment shown in FIG. 3. As appreciated from comparison between a series of steps S1—S20 shown in FIG. 3 and a series of steps S1, S2', S41–S43, S3, S4, S6', S7–S9, S104 and S11–S20 shown in FIG. 7, the modified arithmetic processing of FIG. 7 is similar to the arithmetic processing of FIG. 3, except that in the modified arithmetic processing of FIG. 7, stationary brake friction pad thrust sensor Ssi of the previously-discussed two thrust sensors Smi and Ssi is eliminated. Thus, the same step numbers used to designate steps in the routine shown in FIG. 3 will be applied to the corresponding step numbers used in the modified arithmetic processing shown in FIG. 7, for the purpose of comparison of the two different interrupt routines. Steps S2', S6', S10', and S41–S43 will be hereinafter described in detail with reference to the accompanying drawings, while detailed description of steps S1, S3, S4, S7–S9, and S11–S20 will be omitted because the above description thereon seems to be self-explanatory.

In the system of the second embodiment, at step S2', only the signal value from movable brake friction pad thrust sensor Smi (i=FR, FL, RL, RR), that is, the pressure Fmi of movable brake friction pad Pmi against one side wall of disk rotor 3$i$ is read. Then, step S41 occurs.

At step S41, a rotation angle θDi of disk rotor 3$i$ is read. Actually, rotation angle θDi of disk rotor 3$i$ is calculated based on two signals, namely a reference angular position signal (or an origin signal) of disk rotor 3$i$ that is detected by the pickup coil (the magnetic-force sensing element or the Hall element of wheel speed sensor 17) and a frequency signal proportional to the rotational speed of the serrated rotor of wheel speed sensor 17. Thus, step S41 and wheel speed sensors 17 function as a disk-rotor rotation angle detector that detects disk-rotor rotation angle θDi. Subsequently to step S41, step S42 occurs.

At step S42, a friction-pad position Pi of brake friction material 5$i$ (movable brake friction pad Pmi) is read. Friction-pad position Pi of the movable brake friction material portion (movable brake friction pad Pmi) is calculated when the predetermined condition defined by Fmi=0 becomes satisfied (see step S10') as a braking release position P$_E$. The calculated position Pi of the movable brake friction material portion (movable brake friction pad Pmi) is computed based on (i) the rotation angle of motor shaft 8$a$, (ii) the direction of motor-shaft rotation, and (iii) the screw pitch of ball-screw shaft 10 of rotary-to-linear motion converter 9, each time a transition from a state in which the predetermined condition defined by Fmi=0 is unsatisfied to a state in which the predetermined condition defined by Fmi=0 is satisfied, takes place. Thereafter, when S>So, the routine flows from step S42 through step S4 to step S6'. As set discussed above, step S42 and rotary encoders 14 function as a brake-friction-pad position detector that detects the friction-pad position Pi of the movable brake friction material portion (movable brake friction pad Pmi).

At step S6', a braking-force controlled variable Ci for braking force or braking torque to be produced by electric motor 8 of each electric wheel brake mechanism 1i is calculated based on target pad-to-rotor pressure F* calculated through step S4 and movable-brake-friction-pad side pressure Fmi from a predetermined expression Ci=(F*−Fmi)×a, where a is a coefficient.

After step S6', the routine proceeds through steps S7 and S8 to step S43.

At step S43, a thickness data of disk rotor 3i is calculated based on three factors, namely (i) movable-brake-friction-pad side pressure Fmi calculated through step S2', (ii) rotation angle θDi of disk rotor 3i calculated through step S41, and (iii) friction-pad position Pi of the movable brake friction material portion (movable brake friction pad Pmi) calculated through step S42. The old value of the thickness data of disk rotor 3i is updated by the new thickness data calculated at the current execution cycle. When controlling movable-brake-friction-pad side pressure Fmi based on target pad-to-rotor pressure F* calculated at step S4, movable-brake-friction-pad side pressure Fmi is compensated for responsively to positive and negative fluctuations of the disk-rotor thickness data during rotation of disk rotor 3i. In order to compensate for movable-brake-friction-pad side pressure Fmi, the movable brake friction material portion (movable brake friction pad Pmi) moves toward and away from disk rotor 3i depending on movable-brake-friction-pad side pressure Fmi varying due to positive and negative fluctuations in the disk-rotor thickness data during rotation of disk rotor 3i. Therefore, during rotation of disk rotor 3i it is possible to accurately produce the disk-rotor thickness data by memorizing or storing variations in the position of movable brake friction pad Pmi for every rotation angle θDi of disk rotor 3i at any time (every predetermined sampling time intervals).

Referring now to FIG. 8, there is shown the braking initiation position detection subroutine executed by the electric brake system of the second embodiment. As appreciated from comparison between a series of steps S21–S32 shown in FIG. 5 and a series of steps S21, S22, S51, S23', and S24–S32 shown in FIG. 8, the modified arithmetic processing of FIG. 8 is different from the arithmetic processing of FIG. 5, in that step S23 is replaced by step S23' and step S51 is added between steps S22 and S23'. Thus, the same step numbers used to designate steps in the routine shown in FIG. 5 will be applied to the corresponding step numbers used in the modified arithmetic processing shown in FIG. 8, for the purpose of comparison of the two different interrupt routines. Steps S23' and S51 will be hereinafter described in detail with reference to the accompanying drawings, while detailed description of steps S21, S22, and S24–S32 will be omitted because the above description thereon seems to be self-explanatory.

In the system of the second embodiment, at step S51, a check is made to determine whether or not the disk-rotor angular position corresponds to rotation angle θDi of disk rotor 3i at which a disk rotor portion has the maximum thickness. When the answer to step S51 is negative (NO), that is, the disk-rotor angular position corresponding to rotation angle θDi of disk rotor 3i is not the disk-rotor portion having the maximum thickness, the processor of ECU 23 of the system of the second embodiment determines that there is an increased possibility for movable brake friction pad Pmi to be brought into contact with disk rotor 3i owing to a deflection of disk rotor 3i toward movable brake friction pad Pmi (or movable brake friction pad thrust sensor Smi). In such a case, there is an increased tendency for the unbalanced pressure of brake friction material 5i against disk rotor 3i to be produced by a dragging effect imposed owing to frictional contact of disk rotor 3i with only the movable brake friction pad Pmi. This lowers or deteriorates the detection accuracy for braking initiation position Ps. Thus, the routine proceeds from step S51 to step S24, in order to generate friction-pad position controlled variable CAi for positive displacement of movable brake friction pad Pmi toward disk rotor 3i.

Conversely when the answer to step S51 is affirmative (YES), that is, the position of rotation angle θDi of disk rotor 3i corresponds to the disk-rotor portion having the maximum thickness, the processor of ECU 23 of the system of the second embodiment determines that there is a reduced possibility for movable brake friction pad Pmi to be brought into contact with disk rotor 3i owing to a deflection of disk rotor 3i toward movable brake friction pad Pmi (or movable brake friction pad thrust sensor Smi). In this case, the routine proceeds from step S51 to step S23'.

At step S23', a check is made to determine whether a predetermined condition defined by Fmi>0 is satisfied. When the answer to step S23' is negative (NO), that is, when Fmi=0, the processor of ECU 23 determines that brake friction material 5i (movable brake friction pad Pmi) is held away from the braking initiation position Ps and brake friction material 5i is out of contact with disk rotor 3i. Therefore, the routine proceeds from step S23' to step S24. In contrast, when the answer to step S23' is affirmative (YES) and thus the predetermined condition defined by Fmi>0 is satisfied, the processor of ECU 23 determines that brake friction material 5i (movable brake friction pad Pmi) is held in the braking initiation position and thus brake friction material 5i is in contact with disk rotor 3i. Therefore, the routine proceeds from step S23' to step S25. In the electric brake control routine shown in FIG. 7, the procedure of step S1 and brake manipulated variable sensor 22 function as a brake manipulated variable detector that detects or monitors brake manipulated variable S corresponding to the amount of depression of brake pedal 21. The procedure of step S2 and movable brake friction pad thrust sensor Smi (i=FL, FR, RL, RR) function to detect the pressure (thrust) Fmi of movable brake friction pad Pmi against disk rotor 3i. The procedure of step S43 functions to detect the disk-rotor thickness.

With the previously-discussed system arrangement of the second embodiment, when brake manipulated variable S exceeds predetermined brake-pedal play So due to the driver's brake-pedal depression, the processor of ECU 23 calculates target pad-to-rotor pressure F* based on the value of brake manipulated variable S from the preprogrammed S-F* characteristic map shown in FIG. 4 (see the flow from step S3 to step S4 in FIG. 7). When controlling movable-brake-friction-pad side pressure Fmi based on target pad-to-rotor pressure F* calculated or map-retrieved (see the flow from step S4 through step S6' to step S7 in FIG. 7), movable brake friction pad Pmi moves toward and away from disk rotor 3i depending on movable-brake-friction-pad side pressure Fmi varying positive and negative fluctuations in the disk-rotor thickness data during rotation of disk rotor 3i. Thus, during rotation of disk rotor 3i it is possible to accurately produce the disk-rotor thickness data by memorizing or storing variations in the position of movable brake friction pad Pmi for every rotation angle θDi of disk rotor 3i at any time, that is, every predetermined sampling time intervals (see step S43 in FIG. 7). Thereafter, when the brakes are continuously released by the driver and as a result brake manipulated variable S becomes less than or equal to predetermined brake-pedal play So, a movable brake friction pad position calculated when the pressure Fmi of movable brake friction pad Pmi against disk rotor 3i becomes zero, that is, when the transition from the state defined by Fmi>0 to the state defined by Fmi=0 occurs, is determined or set as a braking release position PE (see the flow from step S3 through steps S9, S10', S11 and S12 to step S13 in FIG. 7). Thereafter, the state defined by the inequality S≦So continues except for re-depression of brake pedal 21, and thus the electric motor of each electric wheel brake mechanism 1i is continuously driven in the reverse-rotational direction (see step S14 in FIG. 7). The continuous reverse-rotation of the electric motor of each electric wheel brake mechanism 1i is executed until brake friction material 5i (in particular, movable brake friction pad Pmi) becomes spaced away from disk rotor 3i by predetermined pad-to-rotor clearance Pc, in other words, until the movable brake friction material portion (movable brake friction pad Pmi) reaches standby position Pw (see steps S14 and S15 in FIG. 7). In the same manner as the system of the first embodiment, the system of the second embodiment is also constructed to execute the braking initiation position detection subroutine shown in FIG. 7 (see the flow from step S11 via step S19 to step S20 of FIG. 7) when predetermined time period t has expired from termination of the electrically powered braking operation, for compensation for undesired offsetting of the actual clearance from predetermined pad-to-rotor clearance Pc, occurring due to heat-contraction of brake friction material 5i. However, the system of the first embodiment uses a single brake friction pad thrust sensor, that is, movable brake friction pad thrust sensor Smi, instead of using both movable brake friction pad thrust sensor Smi and stationary brake friction pad thrust sensor Ssi. If a movable brake friction pad position calculated when movable-brake-friction-pad side pressure Fmi is produced by only the one-sided contact of disk rotor 3i with brake friction material 5i is erroneously determined or detected as a braking initiation position Ps, the detection accuracy for braking initiation position Ps may be lowered or deteriorated. In other words, it is impossible to determine by only the condition defined by Fmi>0 as to whether disk rotor 3i is conditioned in a state of one-sided contact of disk rotor 3i with either one of movable brake friction pad Pmi and fixed brake friction pad Psi or in a state of two-sided contact of disk rotor 3i with both the movable brake friction pad Pmi and fixed brake friction pad Psi. The inventors of the present invention pay their attention to the fact that the degree of friction (i.e., disk-rotor wear) of disk rotor 3i with brake friction material 5i is relatively small at a disk-rotor portion having a relatively smaller deflection, and that its disk-rotor thickness may become maximum owing to the relatively smaller disk-rotor wear. As can be seen from comparison of the both-sided contact state shown in FIG. 9A and the single-sided contact state shown in 9B, when bringing brake friction material 5i into contact with disk rotor 3i, there is an increased tendency for the both-sided contact of disk rotor 3i with brake friction material 5i to occur at the disk-rotor portion having the relatively smaller deflection whose thickness may become maximum owing to the relatively smaller disk-rotor wear. Therefore, in the system of the second embodiment using only the single brake friction pad thrust sensor Smi, a movable brake friction pad position calculated when the first condition that the transition from the state defined by Fmi=0 to the state defined by Fmi>0 takes place and the second condition that the position of rotation angle θDi of disk rotor 3i is the disk-rotor portion having the maximum thickness are both satisfied, is determined or set as a braking initiation position Ps (see the flow from step S51 via step S23' to step S25). Thus, there is a less possibility that a movable brake friction pad position calculated when movable-brake-friction-pad side pressure Fmi is produced by only the one-sided contact of disk rotor 3i with either one of movable brake friction pad Pmi and fixed brake friction pad Psi is erroneously determined or detected as a braking initiation position Ps. This contributes to the enhanced detection accuracy for braking initiation position Ps. After detection of braking initiation position Ps, performed through step S25, the state defined by the inequality S≦So continues except for re-depression of brake pedal 21, and thus the electric motor of each electric wheel brake mechanism 1i is continuously driven in the reverse-rotational direction (see the minus sign of friction-pad position controlled variable—Cci indicated in step S27). The continuous reverse-rotation of the electric motor of each electric wheel brake mechanism 1i is executed until brake friction material 5i (in particular, movable brake friction pad Pmi) becomes spaced away from disk rotor 3i by predetermined pad-to-rotor clearance Pc, in other words, until the movable brake friction material portion (movable brake friction pad Pmi) reaches standby position Pw (see steps S27 and S28). As set out above, according to the system of the second embodiment, it is possible to properly timely maintain the clearance between brake friction material 5i and disk rotor 3i substantially at a constant value (predetermined pad-to-rotor clearance Pc), irrespective of the presence or absence of thermal expansion and thermal contraction. This enables optimal compensation for the pad-to-rotor clearance, regardless of changes in the shape in brake friction material 5i. With the movable brake friction material portion (movable brake friction pad Pmi) kept at standby position Pw, taking account of thermal expansion and thermal contraction of brake friction material 5i, the system of the second embodiment insures a better balanced braking action between one of four road wheels and the other wheel and thus giving the driver a good braking feel.

As will be appreciated from the above, according to the system of the second embodiment, before predetermined time period t expires from termination of the electrically powered braking operation, standby position Pw is determined by using braking release position PE as a reference of predetermined pad-to-rotor clearance Pc. After predetermined time period t has expired from termination of the electrically powered braking operation, standby position Pw is determined by using braking initiation position Ps as a reference of predetermined clearance Pc. Briefly speaking, the system of the second embodiment operates to cause movement of brake friction material 5i into contact with disk rotor 3i (see the plus sign of friction-pad position controlled variable CAi in step S24) under a particular condition where the electric brake system is conditioned in the non-braking state (see the flow from step S23 to step S24) after predetermined time period t has expired from termination of the electrically powered braking operation. In determining the contact position that brake friction material 5i comes into contact with disk rotor 3i as braking initiation position Ps, (i) the previously-noted first condition that the transition from the state defined by Fmi=0 to the state defined by Fmi>0 takes place and (ii) the second condition that the position of rotation angle θDi of disk rotor 3i is the disk-rotor portion having the maximum thickness are used as a criterion needed to more precisely determine braking initiation position Ps. Thus, it is possible to effectively reduce the possibility that braking initiation position Ps is erroneously determined or detected owing to the pressure (or thrust) of brake friction material 5i against disk rotor 3i, produced by only the one-sided contact of disk rotor $3i$ with either one of movable brake friction pad Pmi and fixed brake friction pad Psi. This enhances the accuracy of braking initiation position Ps detection. Additionally, the system of the second embodiment uses a single brake friction pad thrust sensor (movable brake friction pad thrust sensor Smi), instead of using both movable brake friction pad thrust sensor Smi and stationary brake friction pad thrust sensor Ssi. This reduces total manufacturing costs of electric brake systems.

In the system of the second embodiment, rotation angle θDi of disk rotor $3i$ is calculated based on the counted value of the number of teeth of the serrated rotor of wheel speed sensor 17. This type of rotation angle sensor (a passive angular position sensor) is in operative when the vehicle is running and the road wheels rotate, and in inoperative when the vehicle is in the stopped state. In order to be able to detect the angular position of disk rotor $3i$ when the vehicle is in the stopped state as well as when the vehicle is running, the other type of angular position detectors, for example, a rotary encoder, an angular resolver, or an active angular position sensor (an active wheel speed sensor), may be used. Alternatively, a passive wheel speed sensor, having a plurality of magnets having inherent magnetic flux characteristics different from each other and built in teeth of the serrated sensor rotor in a predetermined pattern, maybe used so as to derive the disk-rotor angular position information from different signals based on the plurality of magnets.

In the electric brake control routine and the braking initiation position detection subroutine, executed within ECU 23 of the system of the second embodiment, the sensor signal from movable brake friction pad thrust sensor Smi, which detects the pressure (thrust) Fmi of movable brake friction pad Pmi against disk rotor $3i$, is used. Instead of using movable brake friction pad thrust sensor Smi, stationary brake friction pad thrust sensor Ssi, which detects the pressure (thrust) Fsi of stationary brake friction pad Psi against disk rotor $3i$, may be used. In this case, in the routine of FIGS. 7 and 8, movable-brake-friction-pad side pressure Fmi has to be replaced with stationary-brake-friction-pad side pressure Fsi. That is, in the routine of FIG. 7, at step S2' stationary-brake-friction-pad side pressure Fsi is read, and at step S6' braking-force controlled variable Ci is calculated based on target pad-to-rotor pressure F* calculated and stationary-brake-friction-pad side pressure Fsi from a predetermined expression Ci=(F*−Fsi)×a, and at step S10' a check is made to determine whether a predetermined condition defined by Fsi=0 is satisfied. In addition to the above, in the subroutine of FIG. 8, at step S23' a check is made to determine whether a predetermined condition defined by Fsi>0 is satisfied.

In the system of the second embodiment, the thickness data of disk rotor $3i$, in other words, a disk-rotor angular position versus thickness pattern, is based on three factors, namely (i) movable-brake-friction-pad side pressure Fmi, (ii) disk-rotor rotation angle θDi, and (iii) friction-pad position Pi of movable brake friction pad Pmi. In lieu thereof, the thickness data of disk rotor $3i$ may be calculated based on two factors, namely (i) disk-rotor rotation angle θDi, and (ii) either movable-brake-friction-pad side pressure Fmi or friction-pad position Pi.

In the systems of the first and second embodiments, although a position that movable brake friction pad Pmi has been spaced apart from braking initiation position Ps by predetermined clearance Pc is determined or set as standby position Pw, in lieu thereof braking initiation position Ps itself may be used as standby position Pw. In this case, brake friction material $5i$ is stood by or maintained at standby position Pw (=braking initiation position Ps), until brake manipulated variable S exceeds predetermined brake-pedal play So due to the driver's brake-pedal depression.

In the shown embodiments, the braking initiation position detection subroutine (see FIGS. 5 and 8) is executed after predetermined time period t has expired from a time point when the non-braking state has been recovered. In lieu thereof, the system may be constructed to execute the braking initiation position detection subroutine at the timing when an accelerator inoperative state has been recovered with the brake pedal undepressed (that is, with the brake operating device (brake pedal 21) held at the inoperative state). The accelerator inoperative state can be detected or monitored by means of an accelerator sensor (APS sensor) such as a throttle position sensor serving as an accelerator manipulated variable detector 26 (see FIG. 1) capable of detecting a driver's accelerator manipulated variable of an accelerator pedal (an accelerator operating device). Instead thereof, the system may be constructed to execute the braking initiation position detection subroutine at a timing when a signal value from a temperature sensor, which detects or monitors a temperature of brake friction material $5i$, becomes reduced to a predetermined temperature threshold value below which brake friction material $5i$ recovers from the thermal-expanded state to the adequately cooled state.

In the electric brake control routines of the shown embodiments, target pad-to-rotor pressure F* for each road wheel is calculated or map-retrieved based on brake manipulated variable S from the preprogrammed brake manipulated variable S versus target pad-to-rotor pressure F* characteristic map, in the gross. In lieu thereof, a first target pad-to-rotor pressure F* common to front electric wheel brake mechanisms 1FR and 1FL is calculated or map-retrieved based on brake manipulated variable S from a first preprogrammed brake manipulated variable S versus target pad-to-rotor pressure F* characteristic map and a second target pad-to-rotor pressure F* common to rear electric wheel brake mechanisms 1RR and 1RL is calculated or map-retrieved based on brake manipulated variable S from a second preprogrammed brake manipulated variable S versus target pad-to-rotor pressure F* characteristic map. The second preprogrammed brake manipulated variable S versus target pad-to-rotor pressure F* characteristic map is different from the first preprogrammed S-F* characteristic map, so that the front road wheel group and the rear road wheel group are controlled independently of each other. Alternatively, a first target pad-to-rotor pressure F* common to front-right and rear-left electric wheel brake mechanisms 1FR and 1RL is calculated or map-retrieved based on brake manipulated variable S from a first preprogrammed S-F* characteristic map and a second target pad-to-rotor pressure F* common to front-left and rear-right electric wheel brake mechanisms 1FL and 1RR is calculated or map-retrieved based on brake manipulated variable S from a second preprogrammed S-F* characteristic map, such that the first diagonal road wheel group and the second diagonal road wheel group are controlled independently of each other.

In the shown embodiments, friction-pad position Pi of the movable brake friction material portion (movable brake friction pad Pmi) is computed based on the driving condition of the electric motor, that is, (i) the rotation angle of motor shaft $8a$, (ii) the direction of motor-shaft rotation, and (iii) the screw pitch of ball-screw shaft 10. Instead thereof, an eddy-current type displacement sensor or an eddy-current type displacement pickup may be used so as to generate an electric signal indicative of a relative distance of movable brake friction pad Pmi relative to disk rotor $3i$, in other words, friction-pad position Pi.

In the shown embodiments, in order to prevent the undesirable deviation of the timing of initiation of braking action (or braking force) at one of four road wheels from the timing of initiation of braking action (or braking force) at the other wheel, and to enable brake friction materials 5i of four road wheels to be brought into contact with the respective disk rotors 3i at the same timing, the system is constructed to detect braking initiation position Ps and to determine the position that movable brake friction pad Pmi has been spaced apart from braking initiation position Ps by predetermined clearance Pc as standby position Pw. That is, in the systems of the first and second embodiments, the distance between standby position Pw and braking initiation position Ps is a fixed value (=predetermined clearance Pc) just before initiation of braking operation. In lieu thereof, positions of brake friction materials 5i just before initiation of braking operation may be kept at respective preset positions. In this case, in order to prevent the undesirable deviation of the timing of initiation of braking action (or braking force) at one of four road wheels from the timing of initiation of braking action (or braking force) at the other wheel, and to enable brake friction materials 5i of four road wheels to be brought into contact with the respective disk rotors 3i at the same timing, the system must be constructed to calculate individual control commands for the four electric brake mechanisms 1i so that brake friction materials 5i can be simultaneously brought into contact with the associated disk rotors 3i at the respective braking initiation positions.

The entire contents of Japanese Patent Application No. P2001-401096 (filed Dec. 28, 2001) is incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. An electric brake system comprising:
   a brake manipulated variable sensor that detects a driver's brake manipulated variable of a brake operating device;
   an electric wheel brake mechanism having a pair of brake friction pads that are opposite to each other for sandwiching therebetween a disk rotor rotatable together with a road wheel and for producing a braking force resulting from braking torque application to the disk rotor;
   a first brake friction pad thrust sensor that detects a first pressure of a first one of the brake friction pad pair against one side wall of the disk rotor;
   a second brake friction pad thrust sensor that detects a second pressure of the second brake friction pad against the other side wall of the disk rotor;
   a control unit configured to be electronically connected to the brake manipulated variable sensor, the first and second brake friction pad thrust sensors and the electric wheel brake mechanism, for controlling the electric wheel brake mechanism responsively to the brake manipulated variable, and the first and second pressures; and
   the control unit causing a movement of the brake friction pad pair into contact with the disk rotor when the brake operating device is conditioned in an inoperative state, and detecting a position of the brake friction pad pair, at which the first and second pressures become greater than respective predetermined threshold values during the movement of the brake friction pad pair into contact with the disk rotor, as a braking initiation position.

2. An electric brake system comprising:
   a brake manipulated variable sensor that detects a driver's brake manipulated variable of a brake operating device;
   an electric wheel brake mechanism having a pair of brake friction pads that are opposite to each other for sandwiching therebetween a disk rotor rotatable together with a road wheel and for producing a braking force resulting from braking torque application to the disk rotor;
   a brake friction pad thrust sensor that detects a pressure of either one of the brake friction pad pair against the disk rotor;
   a control unit configured to be electronically connected to the brake manipulated variable sensor, the brake friction pad thrust sensor and the electric wheel brake mechanism, for controlling the electric wheel brake mechanism responsively to the brake manipulated variable, and the pressure of the one brake friction pad against the disk rotor;
   the control unit comprising:
       a maximum disk-rotor thickness angular position detecting section that detects an angular position of the disk rotor at which a disk rotor portion has a maximum thickness; and
       the control unit causing a movement of the brake friction pad pair into contact with the disk rotor when the brake operating device is conditioned in an inoperative state, and detecting a position of the brake friction pad pair, at which the pressure becomes greater than a predetermined threshold value at the angular position of the disk rotor corresponding to the disk rotor portion having the maximum thickness during the movement of the brake friction pad pair into contact with the disk rotor, as a braking initiation position.

3. The electric brake system as claimed in claim 2, which further comprises:
   a rotation-angle detector that detects a rotation angle of the disk rotor; and
   a brake-friction-pad position detector that detects a position of the brake friction pad pair,
   wherein the maximum disk-rotor thickness angular position detecting section detects a disk-rotor angular position versus thickness pattern of the disk rotor based on the rotation angle of the disk rotor, and at least one of the pressure of the one brake friction pad against the disk rotor and the position of the brake friction pad pair.

4. The electric brake system as claimed in claim 1, wherein:
   the control unit causes movement of the brake friction pad pair toward a standby position that the brake friction pad pair is spaced apart from the braking initiation position by a predetermined clearance, after the braking initiation position has been detected.

5. The electric brake system as claimed in claim 1, wherein:
   in order to detect the braking initiation position, the control unit causes the movement of the brake friction pad pair into contact with the disk rotor when a predetermined time period has expired from a time when the brake operating device has been recovered to the inoperative state.

6. The electric brake system as claimed in claim 1, which further comprises:
   an accelerator manipulated variable sensor that detects a driver's accelerator manipulated variable of an accelerator operating device and determines whether the accelerator operating device has been recovered to an inoperative state,
   wherein in order to detect the braking initiation position the control unit causes the movement of the brake friction pad pair into contact with the disk rotor when the brake operating device is conditioned in the inoperative state and the accelerator operating device has been recovered to the inoperative state.

7. An electric brake system comprising:

a brake manipulated variable sensing means for detecting a driver's brake manipulated variable of a brake operating device;

an electric wheel brake means having a pair of brake friction pads that are opposite to each other for sandwiching therebetween a disk rotor rotatable together with a road wheel and for producing a braking force resulting from braking torque application to the disk rotor;

a first brake friction pad thrust sensing means for detecting a first pressure of a first one of the brake friction pad pair against one side wall of the disk rotor;

a second brake friction pad thrust sensing means for detecting a second pressure of the second brake friction pad against the other side wall of the disk rotor;

a brake control means configured to be electronically connected to the brake manipulated variable sensing means, the first and second brake friction pad thrust sensing means and the electric wheel brake means, for controlling the electric wheel brake means responsively to the brake manipulated variable, and the first and second pressures; and the control means causing a movement of the brake friction pad pair into contact with the disk rotor when the brake operating device is conditioned in an inoperative state, and detecting a position of the brake friction pad pair, at which the first and second pressures become greater than respective predetermined threshold values during the movement of the brake friction pad pair into contact with the disk rotor, as a braking initiation position.

8. An electric brake system comprising:

a brake manipulated variable sensing means for detecting a driver's brake manipulated variable of a brake operating device;

an electric wheel brake means having a pair of brake friction pads that are opposite to each other for sandwiching therebetween a disk rotor rotatable together with a road wheel and for producing a braking force resulting from braking torque application to the disk rotor;

a brake friction pad thrust sensing means for detecting a pressure of either one of the brake friction pad pair against the disk rotor;

a control means configured to be electronically connected to the brake manipulated variable sensing means, the brake friction pad thrust sensing means and the electric wheel brake means, for controlling the electric wheel brake means responsively to the brake manipulated variable, and the pressure of the one brake friction pad against the disk rotor;

the control means comprising:

a maximum disk-rotor thickness angular position detecting section that detects an angular position of the disk rotor at which a disk rotor portion has a maximum thickness; and the control means causing movement of the brake friction pad pair into contact with the disk rotor when the brake operating device is conditioned in an inoperative state, and detecting a position of the brake friction pad pair, at which the pressure becomes greater than a predetermined threshold value at the angular position of the disk rotor corresponding to the disk rotor portion having the maximum thickness during the movement of the brake friction pad pair into contact with the disk rotor, as a braking initiation position.

9. A method of detecting a braking initiation position of an electric brake system with a brake manipulated variable sensor detecting a driver's brake manipulated variable, an electric wheel brake mechanism having a pair of brake friction pads that are opposite to each other for sandwiching therebetween a disk rotor rotatable together with a road wheel and for producing a braking force resulting from braking torque application to the disk rotor and based on the brake manipulated variable, a first brake friction pad thrust sensor detecting a first pressure of a first one of the brake friction pad pair against one side wall of the disk rotor, and a second brake friction pad thrust sensor detecting a second pressure of the second brake friction pad against the other side wall of the disk rotor, the method comprising:

causing a primary movement of the brake friction pad pair into contact with the disk rotor when a predetermined time period has expired from a time when a brake pedal has been recovered to an inoperative state; and detecting a position of the brake friction pad pair, at which the first and second pressures become greater than respective predetermined threshold values during the primary movement of the brake friction pad pair into contact with the disk rotor, as the braking initiation position.

10. A method of detecting a braking initiation position of an electric brake system with a brake manipulated variable sensor detecting a driver's brake manipulated variable, an electric wheel brake mechanism having a pair of brake friction pads that are opposite to each other for sandwiching therebetween a disk rotor rotatable together with a road wheel and for producing a braking force resulting from braking torque application to the disk rotor and based on the brake manipulated variable, and a brake friction pad thrust sensor detecting a pressure of either one of the brake friction pad pair against the disk rotor, the method comprising:

detecting an angular position of the disk rotor at which a disk rotor portion has a maximum thickness;

causing a primary movement of the brake friction pad pair into contact with the disk rotor when a predetermined time period has expired from a time when a brake pedal has been recovered to an inoperative state; and detecting a position of the brake friction pad pair, at which the pressure becomes greater than a predetermined threshold value at the angular position of the disk rotor corresponding to the disk rotor portion having the maximum thickness during the primary movement of the brake friction pad pair into contact with the disk rotor, as the braking initiation position.

11. The method as claimed in claim 10, further comprising:

detecting a rotation angle of the disk rotor; and detecting a position of the brake friction pad pair;

detecting a disk-rotor angular position versus thickness pattern of the disk rotor based on the rotation angle of the disk rotor, and at least one of the pressure of the one brake friction pad against the disk rotor and the position of the brake friction pad pair.

12. The method as claimed in claim 9, further comprising:

causing a secondary movement of the brake friction pad pair toward a standby position that the brake friction pad pair is spaced apart from the braking initiation position by a predetermined clearance, after the braking initiation position has been detected.

* * * * *